(12) United States Patent
Zhang et al.

(10) Patent No.: US 12,433,934 B2
(45) Date of Patent: Oct. 7, 2025

(54) METHODS AND COMPOSITIONS FOR PREVENTING AND TREATING ATHEROSCLEROSIS AND RELATED DISEASES

(71) Applicant: Shanghai Puyou Biomedical Co., Ltd., Shanghai (CN)

(72) Inventors: Yinghao Zhang, Shanghai (CN); Guirui Yan, Shanghai (CN); Yao Wang, Shanghai (CN); Jingpeng Fu, Shanghai (CN)

(73) Assignee: SHANGHAI PUYOU BIOMEDICAL CO., LTD., Shanghai (CN)

( * ) Notice: Subject to any disclaimer, the term of this patent is extended or adjusted under 35 U.S.C. 154(b) by 534 days.

(21) Appl. No.: 17/198,034

(22) Filed: Mar. 10, 2021

(65) Prior Publication Data

US 2022/0040257 A1 Feb. 10, 2022

Related U.S. Application Data

(63) Continuation of application No. PCT/CN2019/105220, filed on Sep. 10, 2019.

(30) Foreign Application Priority Data

Sep. 10, 2018 (CN) .......................... 201811052915.1

(51) Int. Cl.
| | |
|---|---|
| *A61K 38/17* | (2006.01) |
| *A61K 45/00* | (2006.01) |
| *A61K 48/00* | (2006.01) |
| *A61P 9/10* | (2006.01) |
| *C07K 14/47* | (2006.01) |

(52) U.S. Cl.
CPC ............ *A61K 38/1709* (2013.01); *A61P 9/10* (2018.01)

(58) Field of Classification Search
CPC .... A61K 38/1709; A61K 38/17; A61K 48/00; A61K 45/00; A01K 2267/0375; C07K 14/4702; C07K 14/47; A61P 9/10; C12N 15/867; C12N 15/861
See application file for complete search history.

(56) References Cited

U.S. PATENT DOCUMENTS

| | | | |
|---|---|---|---|
| 4,500,707 | A | 2/1985 | Caruthers et al. |
| 5,436,327 | A | 7/1995 | Southern et al. |
| 5,700,637 | A | 12/1997 | Southern |
| 5,781,144 | A | 7/1998 | Hwa |
| 10,815,282 | B2 | 10/2020 | Zhang et al. |
| 11,198,712 | B2 | 12/2021 | Zhang et al. |
| 2009/0311271 | A1 | 12/2009 | Harnish et al. |
| 2012/0309040 | A1 | 12/2012 | Madian et al. |
| 2019/0085041 | A1 | 3/2019 | Zhang et al. |
| 2022/0135631 | A1 | 5/2022 | Zhang et al. |

FOREIGN PATENT DOCUMENTS

| | | |
|---|---|---|
| CA | 2399548 A1 | 2/2004 |
| CA | 3029458 A1 | 1/2018 |
| CN | 1660242 A | 8/2005 |
| CN | 1852974 A | 10/2006 |
| CN | 101654481 A | 2/2010 |
| CN | 102256998 A | 11/2011 |
| CN | 102755317 A | 10/2012 |
| CN | 102863525 A | 1/2013 |
| CN | 103215292 A | 7/2013 |
| CN | 107573412 A | 1/2018 |
| CN | 109913483 A | 6/2019 |
| CN | 110302362 A | 10/2019 |
| CN | 111770988 A | 10/2020 |
| CN | 112839953 A | 5/2021 |
| CN | 113150105 A | 7/2021 |
| CN | 114276430 A | 4/2022 |
| EP | 1947112 A2 | 7/2008 |
| JP | 2004121445 A | 4/2004 |
| JP | 2019513023 A | 5/2019 |
| WO | WO-2011138454 A1 | 11/2011 |
| WO | WO-2018006750 A1 | 1/2018 |
| WO | WO-2018165218 A1 | 9/2018 |
| WO | WO-2019179338 A1 * | 9/2019 ............. A61K 38/17 |
| WO | WO-2020052570 A1 | 3/2020 |
| WO | WO-2023040963 A1 | 3/2023 |
| WO | WO-2024056028 A1 | 3/2024 |

OTHER PUBLICATIONS

Atherosclerosis from https://www.hopkinsmedicine.org/health), pp. 1-4. Accessed Jan. 5, 2024. (Year: 2024).*
Arteriosclerosis/atherosclerosis from the Mayo Clinic, pp. 1-8. Accessed Jan. 5, 2024. (Year: 2024).*
WO 2019/179338 Google English translation, pp. 1-9. Sep. 26, 2019. (Year: 2019).*
Baigent, et al. Efficacy and safety of cholesterol-lowering treatment: prospective meta-analysis of data from 90,056 participants in 14 randomised trials of statins. Lancet. Oct. 8, 2005;366(9493):1267-1278. doi: 10.1016/S0140-6736(05)67394-1. Epub Sep. 27, 2005.
Bitter et al. Expression and secretion vectors for yeast. Methods Enzymol 153:516-544 (1987).
Califf, et al. An update on the IMProved reduction of outcomes: Vytorin Efficacy International Trial (IMPROVE-IT) design. Am Heart J. May 2010;159(5):705-709. doi: 10.1016/j.ahj.2010.03.004. Epub Mar. 15, 2010.

(Continued)

*Primary Examiner* — Julie Ha
(74) *Attorney, Agent, or Firm* — WILSON SONSINI GOODRICH & ROSATI

(57) ABSTRACT

Described herein is a method for preventing or treating atherosclerosis or atherosclerosis-related diseases in an individual in need thereof, the method comprising: administering to the individual a therapeutically effective amount of sDSS1 protein or a fragment or variant thereof, a nucleic acid encoding the sDSS1 protein or a fragment or variant thereof or a vector containing the nucleic acid, transplanting into the individual with a cell expressing the sDSS1 protein or a fragment or variant thereof, or tissues or organs containing the sDSS1 protein or a fragment or variant thereof or the nucleic acid, and/or infusing into the individual serum or interstitial fluid containing the sDSS1 protein or a fragment or variant thereof or the nucleic acid.

3 Claims, 11 Drawing Sheets

Specification includes a Sequence Listing.

(56) References Cited

OTHER PUBLICATIONS

Cao, W. et al. AOPPs and the progression of kidney disease. Kidney Int Suppl (2011). Nov. 2014;4(1):102-106.

Chang, L. et al. Protection against β-amyloid-induced synaptic and memory impairments via altering β-amyloid assembly by bis(heptyl)-cognitin. Sci Rep. Jul. 21, 2015;5:10256. doi: 10.1038/srep10256.

Choe, Y.J. et al. Failure of RQC machinery causes protein aggregation and proteotoxic stress. Nature. Mar. 10, 2016; 531(7593):191-5. doi: 10.1038/nature 16973. Epub Feb. 29, 2016.

Cholesterol Treatment Trialists' (CTT) Collaborators et al. The effects of lowering LDL cholesterol with statin therapy in people at low risk of vascular disease: meta-analysis of individual data from 27 randomised trials. Lancet. Aug. 11, 2012;380(9841):581-590. doi: 10.1016/S0140-6736(12)60367-5. Epub May 17, 2012.

Database Geneseq [Online] Sep. 30, 2015 (Sep. 30, 2015). "pan paniscus split hand/foot malformation (ectrodactyly) type 1 (SHFM1), transcript, transcript variant X1, mRNA", XP002792009, retrieved from EBI, Hinxton UK Database accession No. XM_008961980.

Database UniProt [Online] May 31, 2011 (May 31, 2011). "SubName: Full=26S proteasome complex subunit SEMI [ECO:0000313:Ensembl:ENSP00000409481];", XP002792010, retrieved from EBI accession No. Uniprot: F2Z309 Database accession No. F2Z309.

Dobson, CM. Protein misfolding, evolution and disease. Trends Biochem Sci. Sep. 1999;24(9):329-32.

Dunlop, et al. Proteins containing oxidized amino acids induce apoptosis in human monocytes. Biochem J. Apr. 1, 2011;435(1):207-216. doi: 10.1042/BJ20100682.

European search report and opinion dated May 31, 2022 for EP Application No. 19859035.8.

Extended European Search Report for EP17823562.8 dated Jun. 27, 2019.

Fernandez, MS. Human IAPP amyloidogenic properties and pancreatic β-cell death. Cell Calcium. Nov. 2014;56(5):416-27. doi: 10.1016/j.ceca.2014.08.011. Epub Aug. 27, 2014.

Fonteneau, et al. Serum-Mediated Oxidative Stress From Systemic Sclerosis Patients Affects Mesenchymal Stem Cell Function. Front Immunol. Sep. 1, 2017;8:988. doi: 10.3389/fimmu.2017.00988. eCollection 2017.

Gao, et al. Association Between Circulating Oxidized LDL and Atherosclerotic Cardiovascular Disease: A Meta-analysis of Observational Studies. Can J Cardiol. Dec. 2017;33(12):1624-1632. doi: 10.1016/j.cjca.2017.07.015. Epub Jul. 29, 2017. (Accepted Manuscript).

GenBank accession No. XM_008961980.1, retrieved from https://www.ncbi.nlm.nih.gov/nuccore/ XM_008961980.1, retrieved on Jul. 27, 2017, Sep. 30, 2015.

GenBank accession No. XP_008960228.1, retrieved from https://www.ncbi.nlm.nih.gov/protein/ XM_008960228.1, retrieved on Jul. 27, 2017, Sep. 30, 2015.

GenPept NCBI Reference Sequence: NP_001380829.1, 26S proteasome complex subunit SEM1 isoform b [Homo sapiens]. NCBI, Jul. 14, 2023 (Jul. 14, 2023).

GenPept NCBI Reference Sequence: XP_008960228.1, 26S proteasome complex subunit SEM1 isoform X1 [Pan paniscus]. NCBI, May 1, 2018 (May 1, 2018).

Gillotte-Taylor, et al. Scavenger receptor class B type I as a receptor for oxidized low density lipoprotein. J Lipid Res. Sep. 2001;42(9):1474-1482.

Gisterå, et al. The immunology of atherosclerosis. Nat Rev Nephrol. Jun. 2017;13(6):368-380. doi: 10.1038/nrneph.2017.51. Epub Apr. 10, 2017.

Gong, C.X. DSSylation, a novel guide for protein degradation? Protein Cell. Feb. 2014;5(2):91-93. doi: 10.1007/s13238-014-0020-9.

Harmon, et al. Associations of Circulating Oxidized LDL and Conventional Biomarkers of Cardiovascular Disease in a Cross-Sectional Study of the Navajo Population. PLoS One. Mar. 3, 2016;11(3):e0143102. doi: 10.1371/journal.pone.0143102. eCollection 2016.

International search report dated Oct. 9, 2017 for PCT/CN2017/090785.

International search report with written opinion dated Dec. 13, 2019 for PCT/CN2019/105220 (English Translation).

Kim, H.Y. et al. EPPS rescues hippocampus-dependent cognitive deficits in APP/PS1 mice by disaggregation of amyloid-β oligomers and plaques. Nat Commun 6, 8997 (2015) doi: 10.1038/ncomms9997.

Kragelund, et al. DSS1/Sem1, a Multifunctional and Intrinsically Disordered Protein. Trends Biochem Sci. May 2016;41(5):446-459. doi: 10.1016/j.tibs.2016.02.004. Epub Mar. 1, 2016.

Law, et al. By how much and how quickly does reduction in serum cholesterol concentration lower risk of ischaemic heart disease? BMJ. Feb. 5, 1994;308(6925):367-72. doi: 10.1136/bmj.308.6925.367.

Li, et al. DSS1 is required for the stability of BRCA2. Oncogene. Feb. 23, 2006;25(8):1186-94. doi: 10.1038/sj.onc.1209153.

Liang, M. et al. Advanced oxidation protein products promote NADPH oxidase-dependent β-cell destruction and dysfunction through the Bcl-2/Bax apoptotic pathway. Lab Invest. Jul. 2017; 97(7):792-805. doi: 10.1038/labinvest.2017.24. Epub Mar. 6, 2017.

Liang, M. et al. Increased plasma advanced oxidation protein products is an early marker of endothelial dysfunction in type 2 diabetes patients without albuminuria. J Diabetes. Sep. 2014;6(5):417-26. doi: 10.1111/1753-0407.12134. Epub Mar. 27, 2014.

Libby, et al. Inflammation and atherosclerosis. Circulation. Mar. 5, 2002;105(9):1135-1143. doi: 10.1161/hc0902.104353.

Libby P. Inflammation in atherosclerosis. Nature. Dec. 19-26, 2002;420(6917):868-874. doi: 10.1038/nature01323.

Lim, Y.A. et al. Aβ and human amylin share a common toxicity pathway via mitochondrial dysfunction. Proteomics. Apr. 2010; 10(8):1621-33. doi: 10.1002/pmic.200900651.

Liu, et al. Human BRCA2 protein promotes RAD51 filament formation on RPA-covered single-stranded DNA. Nat Struct Mol Biol. Oct. 2010;17(10):1260-2. doi: 10.1038/nsmb.1904. Epub Aug. 22, 2010.

Ma, et al. Identification of the deleted in split hand/split foot 1 protein as a novel biomarker for human cervical cancer. Carcinogenesis. Jan. 2013;34(1):68-78. doi: 10.1093/carcin/bgs279. Epub Sep. 28, 2012.

Marston, et al. Interaction between the product of the breast cancer susceptibility gene BRCA2 and DSS1, a protein functionally conserved from yeast to mammals. Mol Cell Biol. Jul. 1999;19(7):4633-42. doi: 10.1128/MCB.19.7.4633.

Matteucci, et al. The synthesis of oligodeoxyprimidines on a polymer support. Tetrahedron Letters 21.8 (1980): 719-722. doi:10.1016/S0040-4039(00)71455-.

Motamed, et al. Oxidized Low-Density Lipoprotein (ox-LDL) to LDL Ratio (ox-LDL/LDL) and ox-LDL to High-Density Lipoprotein Ratio (ox-LDL/HDL): Are they Accurate Biomarkers of Type 2 Diabetes Mellitus? Clin Lab. Sep. 1, 2016;62(9):1609-1617. doi: 10.7754/Clin.Lab.2016.150412.

National Cholesterol Education Program (NCEP) Expert Panel on Detection, Evaluation, and Treatment of High Blood Cholesterol in Adults (Adult Treatment Panel III). Third Report of the National Cholesterol Education Program (NCEP) Expert Panel on Detection, Evaluation, and Treatment of High Blood Cholesterol in Adults (Adult Treatment Panel III) final report. Circulation. Dec. 17, 2002;106(25):3143-421.

Notice of Allowance dated Jul. 28, 2020 for U.S. Appl. No. 16/145,251.

Notice of Allowance dated Oct. 5, 2021 for U.S. Appl. No. 17/028,769.

Office action dated Apr. 3, 2020 for U.S. Appl. No. 16/145,251.

Office action dated Sep. 16, 2021 for U.S. Appl. No. 17/028,769.

Office action dated Dec. 13, 2019 for U.S. Appl. No. 16/145,251.

Ott, C. et al. Protein oxidation and proteolytic signalling in aging. Curr Pharm Des. 2014;20(18):3040-51.

Pawlak, et al. Oxidized low-density lipoprotein (oxLDL) plasma levels and oxLDL to LDL ratio—are they real oxidative stress

(56) References Cited

OTHER PUBLICATIONS markers in dialyzed patients? Life Sci. Mar. 12, 2013;92(4-5):253-8. doi: 10.1016/j.lfs.2012.12.002. Epub Jan. 4, 2013.
Pirillo, et al. LOX-1, OxLDL, and atherosclerosis. Mediators Inflamm. 2013;2013:152786. doi: 10.1155/2013/152786. Epub Jul. 10, 2013.
Predicted: 26S proteasome complex subunit DSS1 isoform X1 [Pan paniscus], Sep. 30, 2015. NCBI Reference Sequence: XP_008960228.1.
Ren, et al. Long-term coronary heart disease risk associated with very-low-density lipoprotein cholesterol in Chinese: the results of a 15-Year Chinese Multi-Provincial Cohort Study (CMCS). Atherosclerosis. Jul. 2010;211(1):327-332. doi: 10.1016/j.atherosclerosis.2010.02.020. Epub Feb. 21, 2010.
Rezano, A. et al. Breast cancers with high DSS1 expression that potentially maintains BRCA2 stability have poor prognosis in the relapse-free survival. BMC Cancer. Dec. 1, 2013;13:562. doi: 10.1186/1471-2407-13-562.
Ross R. Atherosclerosis—an inflammatory disease. N Engl J Med. Jan. 14, 1999;340(2):115-126. doi: 10.1056/NEJM199901143400207.
Rossouw, et al. The value of lowering cholesterol after myocardial infarction. N Engl J Med. Oct. 18, 1990;323(16):1112-9. doi: 10.1056/NEJM199010183231606.
Sadigh-Eteghad, S. et al. Amyloid-beta: a crucial factor in Alzheimer's disease. Med Princ Pract. 2015;24(1):1-10. doi: 10.1159/000369101. Epub Nov. 27, 2014.
Sambrook et al., Molecular Cloning: A Laboratory Manual, 2nd edition, Cold Spring Harbor Laboratory Press (1989).
Simm, A. et al. Protein glycation—Between tissue aging and protection. Exp Gerontol. Aug. 2015;68:71-5. doi: 10.1016/j.exger.2014.12.013. Epub Dec. 20, 2014.
Singh, et al. BRCA1 is a novel target to improve endothelial dysfunction and retard atherosclerosis. J Thorac Cardiovasc Surg. Oct. 2013;146(4):949-960.e4. doi: 10.1016/j.jtcvs.2012.12.064. Epub Feb. 14, 2013.
Sun, et al. Distinct mechanisms for OxLDL uptake and cellular trafficking by class B scavenger receptors CD36 and SR-BI. J Lipid Res. Dec. 2007;48(12):2560-70. doi: 10.1194/jlr.M700163-JLR200. Epub Sep. 17, 2007.
The Lipid Research Clinics Coronary Primary Prevention Trial results. I. Reduction in incidence of coronary heart disease. JAMA vol. 251,3 (1984): 351-64. doi:10.1001/jama.1984.03340270029025.
Turell, et al. Mechanisms and consequences of protein cysteine oxidation: the role of the initial short-lived intermediates. Essays Biochem. Feb. 17, 2020;64(1):55-66. doi: 10.1042/EBC20190053.
UniProtKB—F2Z309 (F2Z309_Human). 26S proteasome complex subunit SEM1. Retrieved from https://www.uniprot.org/uniprot/F2Z309 . Last modified: May 31, 2011—v1.
Van Silfhout, et al. Split hand/foot malformation due to chromosome 7q aberrations(SHFM1): additional support for functional0 haploinsufficiency as the causative mechanism. Eur J Hum Genet. Nov. 2009; 17(11):1432-8. doi: 10.1038/ejhg.2009.72. Epub Apr. 29, 2009.
Winblad, B. et al. Safety, tolerability, and antibody response of active Aβ immunotherapy with CAD106 in patients with Alzheimer's disease: randomised, double-blind, placebo-controlled, first-in-human study. Lancet Neurol. Jul. 2012;11(7):597-604. doi: 10.1016/S1474-4422(12)70140-0. Epub Jun. 6, 2012.
Xu, et al. oxLDL/β2GPI/anti-β2GPI complex induced macrophage differentiation to foam cell involving TLR4/NF-kappa B signal transduction pathway. Thromb Res. Aug. 2014;134(2):384-392. doi: 10.1016/j.thromres.2014.05.017. Epub May 20, 2014.
Zhang, Y. et al. DSSylation, a novel protein modification targets proteins induced by oxidative stress, and facilitates their degradation in cells. Protein Cell. Feb. 2014;5(2):124-40. doi: 10.1007/s13238-013-0018-8. Epub Feb. 11, 2014.
Zhao, LN. et al. The toxicity of amyloid β oligomers. Int J Mol Sci. 2012;13(6):7303-27. doi: 10.3390/ijms13067303. Epub Jun. 13, 2012.
Zhou, et al. Dss1 interaction with Brh2 as a regulatory mechanism for recombinational repair. Mol Cell Biol. Apr. 2007;27(7):2512-26. doi: 10.1128/MCB.01907-06. Epub Jan. 29, 2007.
Crackower, M.A. et al., Characterization of the split hand/split foot malformation locus SHFM1 at 7q21.3-q22.1 and analysis of a candidate gene for its expression during limb development, Human Molecular Genetics 5(5):571-579 (1996).
Database Geneseq [Online] Sep. 30, 2015 (Sep. 30, 2015), "pan paniscus split hand/foot malformation (ectrodactyly) type 1 SHFM1), transcript, transcript variant XI, mRNA", retrieved from EBI, HINXTON UK Database accession No. XM_008961980.2.
Database UniProt [Online] May 31, 2011 (May 31, 2011), "SubName: Full=265 proteasome complex subunit SEMI [ECO:0000313I Ensembl:ENSP00000409481];", retrieved from EBI accession No. UN IPROT:F2Z309 Database accession No. F2Z309.
Gong, C-X., DSSylation, a novel guide for protein degradation? Protein & Cell 5(2), 3 pages (2014).
Shao, D. et al., Dietary compounds have potential in controlling atherosclerosis by modulating macrophage cholesterol metabolism and inflammation via miRNA, npj Science of Food 2(13):9 pages (2018).
U.S. Appl. No. 17/521,286 Office Action dated Dec. 22, 2023.
Zhang, Y. et al., DSSylation, a novel protein modification targets proteins induced by oxidative stress, and facilitates their degradation in cells, Protein & Cell 5(2):124-140 (2014).
Ma, Chao. et al. Supercharged Proteins and Polypeptides. Advanced materials 32(20):e1905309, 1-21 (2020).
PCT/CN2022/119040 International Search Report and Written Opinion dated Dec. 13, 2022.
U.S. Appl. No. 17/521,286 Office Action dated Jul. 16, 2024.
Wei, Sung-Jen. et al. Identification of a specific motif of the DSS1 protein required for proteasome interaction and p53 protein degradation. Journal of molecular biology 383(3):693-712 (2008).
Zhang, Yinghao et al. DSSylation, a novel protein modification targets proteins induced by oxidative stress, and facilitates their degradation in cells. Protein and cell 5(2):124-140 (2014).
Erbay et al. Is Intracranial Atherosclerosis an Independent Risk Factor for Cerebral Atrophy? A Retrospective Evaluation. BMC Neurology 8(51):1-8 (2008).
Lao et al. Atherosclerotic Renal Artery Stenosis—Diagnosis and Treatment. Mayo Clin Proc. 86(7):649-657 (2011).
Paterno et al. The Etiology and Pathogenesis of Vascular Disorders of the Intestine. Radiol Clin N Am. 46:877-885 (2008).
Azharuddin, Mohammad et al. Dry eye: a protein conformational disease. Investigative ophthalmology and visual science 56(3):1423-1429 (2015).
Fini, M Elizabeth. et al. Therapeutic Potential of the Molecular Chaperone and Matrix Metalloproteinase Inhibitor Clusterin for Dry Eye. International journal of molecular sciences 22(1):116, 1-15 (2020).
Kim, Chae Eun. et al. RGN-259 (thymosin beta4) improves clinically important dry eye efficacies in comparison with prescription drugs in a dry eye model. Scientific reports 8(1):10500, 1-14 (2018).
U.S. Appl. No. 17/521,286 Office Action dated Jun. 4, 2025.
Bian, Yangyang. et al. An enzyme assisted RP-RPLC approach for in-depth analysis of human liver phosphoproteome. J Proteomics 96:253-262 (2014). Published Online Nov. 22, 2013.

\* cited by examiner

Bright field    DiI fluorescence

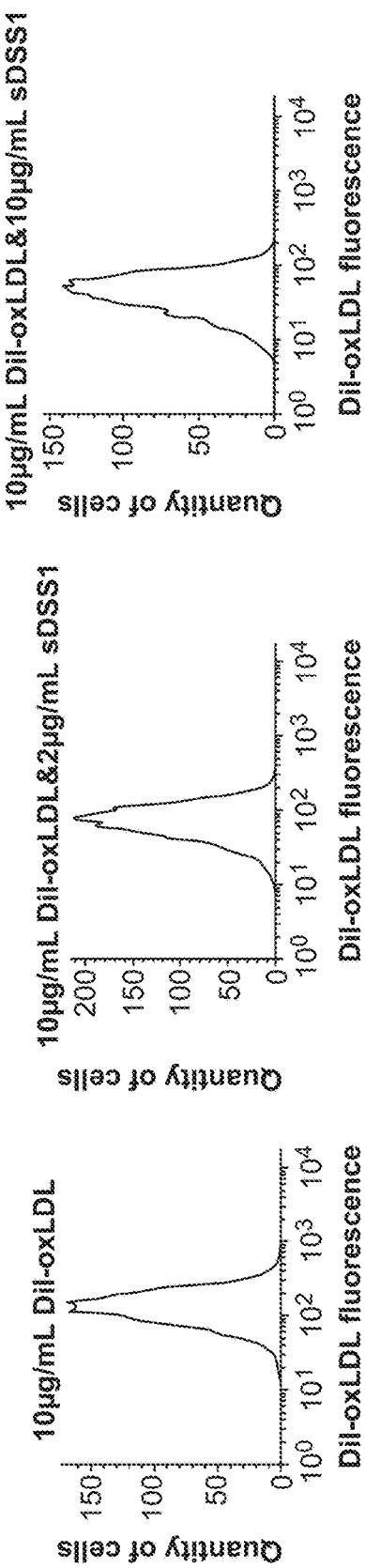
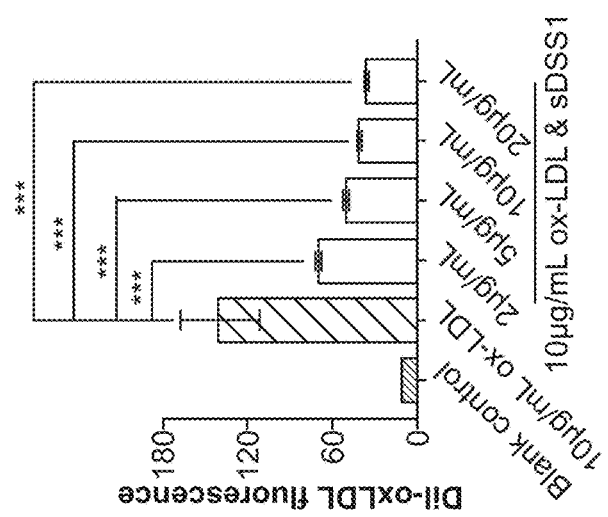
FIG. 3A  FIG. 3B  FIG. 3C
FIG. 4

Bright field  DiI fluorescence
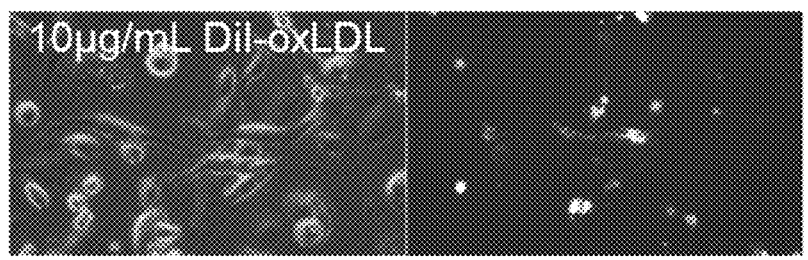
FIG. 5A  FIG. 5D

FIG. 5B  FIG. 5E
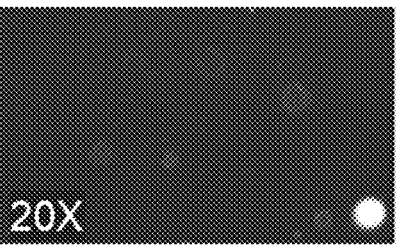
FIG. 5C  FIG. 5F

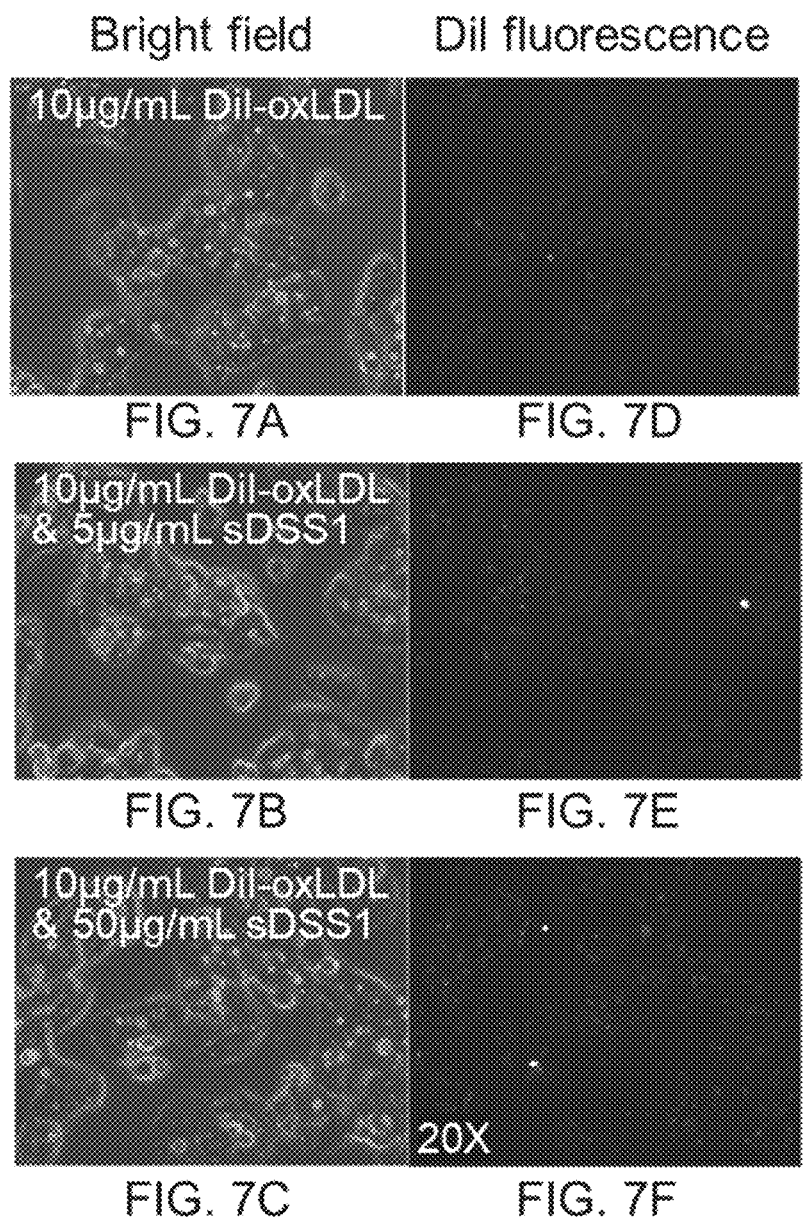

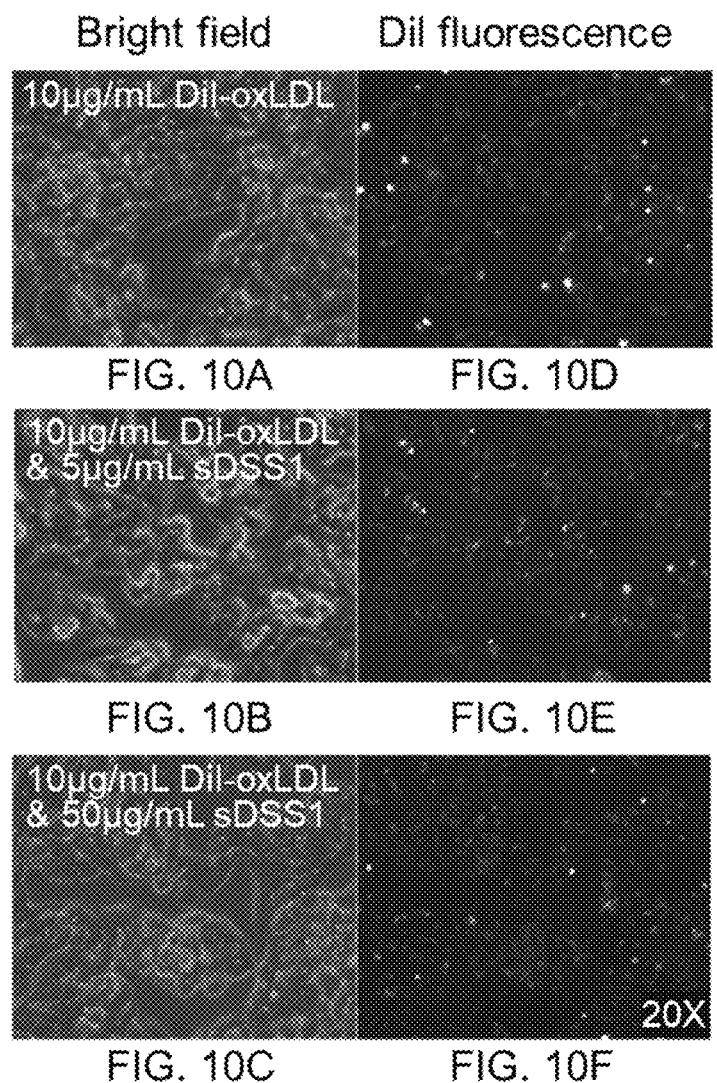
FIG. 10A  FIG. 10D
FIG. 10B  FIG. 10E
FIG. 10C  FIG. 10F
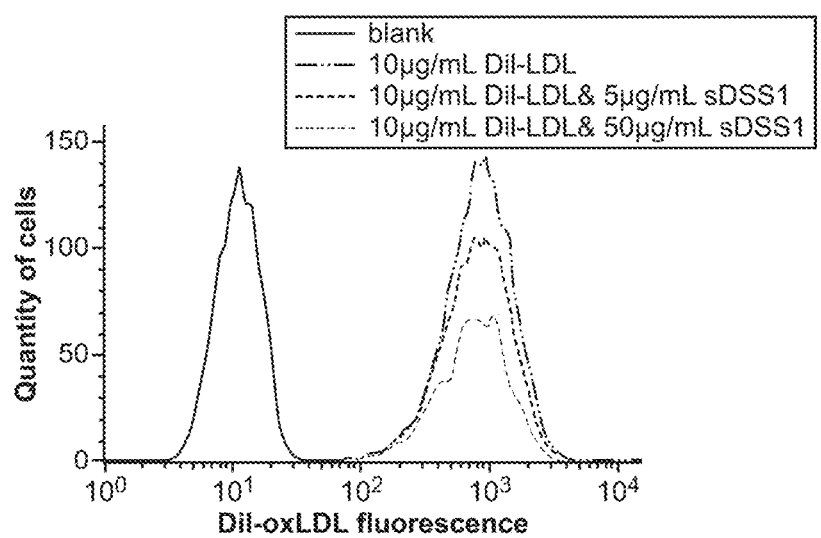
FIG. 11

SEQUENCE LISTING

<160> NUMBER OF SEQ ID NOS: 18

<210> SEQ ID NO 1
<211> LENGTH: 89
<212> TYPE: PRT
<213> ORGANISM: Homo sapiens

<400> SEQUENCE: 1

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asn Val
        35                  40                  45

Glu Asp Asp Phe Ser Asn Gln Leu Arg Ala Thr Val Leu Leu Met Ile
    50                  55                  60

Leu Val Cys Glu Thr Pro Tyr Gly Cys Tyr Val Leu His Gln Lys Gly
65                  70                  75                  80

Arg Met Cys Ser Ala Phe Leu Cys Cys
                85

<210> SEQ ID NO 2
<211> LENGTH: 89
<212> TYPE: PRT

<213> ORGANISM: Pan troglodytes

<400> SEQUENCE: 2

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Ala Thr Val Leu Leu Met Ile
        50                  55                  60

Leu Val Cys Glu Thr Pro Tyr Gly Cys Tyr Val Leu His Gln Lys Gly
65                  70                  75                  80

Arg Met Cys Ser Ala Phe Leu Cys Cys
                85

<210> SEQ ID NO 3
<211> LENGTH: 89
<212> TYPE: PRT
<213> ORGANISM: Pan paniscus

<400> SEQUENCE: 3

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Ala Thr Val Leu Leu Met Ile
        50                  55                  60

Leu Val Cys Glu Thr Pro Tyr Gly Cys Tyr Val Leu His Gln Lys Gly
65                  70                  75                  80

Arg Met Cys Ser Ala Phe Leu Cys Cys
                85

<210> SEQ ID NO 4
<211> LENGTH: 89
<212> TYPE: PRT
<213> ORGANISM: Gorilla sp.

<400> SEQUENCE: 4

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Ala Thr Val Leu Leu Met Val
        50                  55                  60

Leu Val Cys Glu Thr Pro Tyr Gly Cys Tyr Val Leu His Gln Lys Glu
65                  70                  75                  80

Arg Met Cys Ser Ala Phe Leu Cys Cys
                85

<210> SEQ ID NO 5
<211> LENGTH: 89
<212> TYPE: PRT
<213> ORGANISM: Pongo sp.

<400> SEQUENCE: 5

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Val Thr Val Leu Leu Met Ile
        50                  55                  60

Leu Val Cys Glu Thr Leu Tyr Gly Cys Tyr Val Leu His Gln Lys Gly
65                  70                  75                  80

Arg Met Cys Ser Ala Phe Leu Cys Cys
                85

<210> SEQ ID NO 6
<211> LENGTH: 89
<212> TYPE: PRT
<213> ORGANISM: Nomascus leucogenys

<400> SEQUENCE: 6

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Ala Thr Ile Leu Leu Met Ile
        50                  55                  60

Leu Val Cys Glu Thr Pro Tyr Gly Cys Tyr Val Leu His Gln Lys Gly
65                  70                  75                  80

Arg Met Cys Ser Ala Phe Leu Cys Cys
                85

<210> SEQ ID NO 7
<211> LENGTH: 89
<212> TYPE: PRT
<213> ORGANISM: Rhinopithecus roxellana

<400> SEQUENCE: 7

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
                20                  25                  30

Asp Glu Asp Ala His Val Trp Glu Asp Asn Trp Asp Asp Asp Asn Val
            35                  40                  45

Glu Asp Asp Phe Ser Asn Gln Leu Arg Ala Thr Val Leu Leu Met Ile
        50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 8
<211> LENGTH: 89
<212> TYPE: PRT
<213> ORGANISM: Macaca mulatta

```
<400> SEQUENCE: 8

Met Ser Glu Lys Lys Gln Pro Val Asp Leu Gly Leu Leu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
            35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 9
<211> LENGTH: 89
<212> TYPE: PRT
<213> ORGANISM: Rhinopithecus bieti

<400> SEQUENCE: 9

Met Ser Glu Lys Lys Gln Pro Val Asp Leu Gly Leu Leu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
            35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ile Ala Phe Leu Cys Cys
                85

<210> SEQ ID NO 10
<211> LENGTH: 89
<212> TYPE: PRT
<213> ORGANISM: Papio anubis

<400> SEQUENCE: 10

Met Ser Glu Lys Lys Gln Pro Val Asp Leu Gly Leu Leu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
            35                  40                  45

Glu Asp Asp Phe Ser Asn Gln Leu Arg Ala Thr Val Leu Leu Met Lys
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 11
<211> LENGTH: 89
<212> TYPE: PRT
<213> ORGANISM: Colobus angolensis

<400> SEQUENCE: 11
```

Met Ser Glu Lys Lys Gln Pro Val Asp Leu Gly Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asp Asn Trp Asp Asp Asn Val
        35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 12
<211> LENGTH: 89
<212> TYPE: PRT
<213> ORGANISM: Cercocebus atys

<400> SEQUENCE: 12

Met Ser Glu Lys Lys Gln Pro Val Asp Leu Gly Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asp Asn Trp Asp Asp Asn Val
        35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 13
<211> LENGTH: 89
<212> TYPE: PRT
<213> ORGANISM: Mandrillus leucophaeus

<400> SEQUENCE: 13

Met Ser Glu Lys Lys Gln Pro Val Asp Leu Gly Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asp Asn Trp Asp Asp Asn Val
        35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 14
<211> LENGTH: 89
<212> TYPE: PRT
<213> ORGANISM: Macaca nemestrina

<400> SEQUENCE: 14

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
        35                  40                  45

Glu Asp Asp Phe Ser Asn Gln Leu Arg Ala Thr Val Leu Leu Met Ile
    50                  55                  60

Lys Val Tyr Glu Thr Pro Tyr Gly Cys Tyr Ile Leu His Gln Lys Gly
65                  70                  75                  80

Arg Met Cys Ser Ala Phe Leu Cys Cys
                85

<210> SEQ ID NO 15
<211> LENGTH: 89
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
        35                  40                  45

Glu Asp Asp Phe Ser Asn Gln Leu Arg Ala Thr Val Leu Leu Met Ile
    50                  55                  60

Leu Val Ala Glu Thr Pro Tyr Gly Ala Tyr Val Leu His Gln Lys Gly
65                  70                  75                  80

Arg Met Ala Ser Ala Phe Leu Ala Ala
                85

<210> SEQ ID NO 16
<211> LENGTH: 89
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 16

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asn Trp Asp Asp Asn Val
        35                  40                  45

Glu Asp Asp Phe Ser Asn Gln Leu Arg Ala Thr Val Leu Leu Met Ile
    50                  55                  60

Leu Val Val Glu Thr Pro Tyr Gly Val Tyr Val Leu His Gln Lys Gly
65                  70                  75                  80

Arg Met Val Ser Ala Phe Leu Val Val
                85

<210> SEQ ID NO 17
<211> LENGTH: 58

```
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Met Ser Glu Lys Lys Gln Pro Val Asp Leu Gly Leu Leu Glu Glu Asp
1               5                   10                  15

Asp Glu Phe Glu Glu Phe Pro Ala Glu Asp Trp Ala Gly Leu Asp Glu
            20                  25                  30

Asp Glu Asp Ala His Val Trp Glu Asp Asn Trp Asp Asp Asn Val
        35                  40                  45

Glu Asp Asp Phe Ser Asn Gln Leu Arg Ala
    50                  55

<210> SEQ ID NO 18
<211> LENGTH: 31
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Thr Val Leu Leu Met Ile Leu Val Cys Glu Thr Pro Tyr Gly Cys Tyr
1               5                   10                  15

Val Leu His Gln Lys Gly Arg Met Cys Ser Ala Phe Leu Cys Cys
            20                  25                  30
```

METHODS AND COMPOSITIONS FOR PREVENTING AND TREATING ATHEROSCLEROSIS AND RELATED DISEASES

CROSS-REFERENCE

This application is continuation of International Patent Application No. PCT/CN2019/105220, filed Sep. 10, 2019, which claims the benefit of Chinese Patent Application No. 201811052915.1, filed Sep. 10, 2018, both of which are incorporated herein in their entireties by reference for all purposes.

TECHNICAL FIELD

The content of the present invention belongs to the field of biomedicines, and relates to methods and compositions for preventing and treating atherosclerosis and related diseases.

SEQUENCE LISTING

The instant application contains a Sequence Listing which has been submitted electronically in ASCII format and is hereby incorporated by reference in its entirety. Said ASCII copy, created on May 13, 2021, is named 57275_702_301 SL.txt and is 14,863 bytes in size.

BACKGROUND

Atherosclerosis refers to the dysfunction of arterial vessels due to lipid accumulation in arterial vessel walls forming lipid streaks or atherosclerotic plaques. Arterial vasomotor function decrease, luminal stenosis and even thrombus due to plaque formation in turn affect the blood supply of tissues and organs supplied by the artery, resulting in local or overall ischemia of the tissues and organs.

For a long time, there has been a demand for drugs and/or treatment methods that can more effectively prevent and/or treat atherosclerosis and atherosclerosis-related diseases.

SUMMARY

Therefore, there is a need for novel treatment methods for atherosclerosis or atherosclerosis-related diseases. The present invention fulfills such need and also provides related advantages. The method, composition and/or application of the present invention can significantly reduce the level of oxidized low-density lipoprotein in disease model animals, reduce atherosclerotic plaque formation, and inhibit the progression of atherosclerosis.

In one aspect, provided herein is a method for preventing or treating atherosclerosis or atherosclerosis-related diseases in an individual in need thereof, comprising administering to the individual a therapeutically effective amount of sDSS1 protein or a fragment or variant thereof, a nucleic acid encoding the sDSS1 protein or a fragment or variant thereof or a vector containing the nucleic acid, transplanting into the individual with a cell expressing the sDSS1 protein or a fragment or variant thereof, or tissues or organs containing the sDSS1 protein or a fragment or variant thereof or the nucleic acid, and/or infusing into the individual serum or interstitial fluid containing the sDSS1 protein or a fragment or variant thereof or the nucleic acid.

In some specific embodiments, the sDSS1 protein or a fragment or variant thereof has at least 80%, 85%, 90%, 95%, 98%, or 100% sequence identity with the sequence as shown in SEQ ID NO:1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment that contributes to achieving transmembrane transport function. In some specific embodiments, the sDSS1 protein or a fragment or variant thereof comprises chemical modifications on 1 to 20 amino acids. In some specific embodiments, the chemical modification comprises amino or glycosylation modification, fatty acid modification, acylation modification, Fc fragment fusion, albumin fusion, pegylation modification, dextran modification, heparin modification, polyvinylpyrrolidone modification, polyamino acid modification, polysialic acid modification, chitosan and its derivative modification, lectin modification, sodium alginate modification, carbomer modification, polyvinylpyrrolidone modification, hydroxypropyl methylcellulose modification, hydroxypropyl cellulose modification, acetylation modification, formylation modification, phosphorylation modification, methylation modification and/or sulfonation modification. In some specific embodiments, the vector comprises a eukaryotic expression plasmid vector, adenovirus, adeno-associated virus, lentivirus, retrovirus, baculovirus, herpes virus, or pseudorabies virus. In some specific embodiments, the cell is any one of a stem cell, a precursor cell or an adult cell of humans. In some specific embodiments, the stem cell is an induced pluripotent stem cell, a cell obtained by transdifferentiation, or a stem cell derived from a primary culture, a pluripotent or unipotent stem cell differentiated from a parent cell. In some specific embodiments, the tissue is a whole organ or a partial tissue mass of a brain, liver, kidney, spleen or pancreatic islets, or blood, fat, muscle, bone marrow or skin. In some specific embodiments, the method further comprises administering a hypolipidemic drug to the individual. In some specific embodiments, the method further comprises administering an antihypertensive drug to the individual. In some specific embodiments, the method further comprises administering an anticoagulant to the individual. In some specific embodiments, the individual undergoes a surgical procedure selected from a group consisting of percutaneous coronary intervention, coronary artery bypass grafting, or carotid endarterectomy. In some specific embodiments, the method reduces lipid accumulation in the arterial vessel walls. In some specific embodiments, the lipid comprises one or more of cholesterol, cholesterol ester, triglyceride, chylomicron (CM), low-density lipoprotein (LDL), very low-density lipoprotein (VLDL), intermediate density lipoprotein (IDL), lipoprotein (a) (Lp(a)), oxidized low-density lipoprotein (oxLDL) and the respective metabolic intermediates thereof in the blood. In some specific embodiments, the atherosclerosis or atherosclerosis-related diseases comprise vascular inner diameter stenosis, vascular outer diameter dilation, decreased vasoconstriction and vasodilatation capacity, decreased vascular elasticity, increased vascular fragility, angiolithic degeneration or calcinosis, or thrombus-induced reduction in blood supply capacity of blood vessels. In some specific embodiments, the atherosclerosis or atherosclerosis-related diseases comprise hypertension, angina pectoris, myocardial infarction, myocardium blood-supply insufficiency, arrhythmia, cerebral blood supply insufficiency, cerebral ischemic stroke, cerebral atrophy, renal insufficiency, renal artery stenosis, paralytic ileus, or acral ischemic necrosis.

In another aspect, provided herein is a method for reducing lipid absorption by vascular endothelium in an individual in need thereof, comprising administering to the individual a therapeutically effective amount of sDSS1 protein or a fragment or variant thereof. In some specific embodiments, the sDSS1 protein or a fragment or variant thereof has at least 80%, 85%, 90%, 95%, 98%, or 100% sequence identity with the sequence as shown in SEQ ID NO: 1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a method for reducing lipid accumulation in macrophages in an individual in need thereof, comprising administering to the individual a therapeutically effective amount of sDSS1 protein or a fragment or variant thereof. In some specific embodiments, the sDSS1 protein or a fragment or variant thereof has at least 80%, 85%, 90%, 95%, 98%, or 100% sequence identity with the sequence as shown in SEQ ID NO:1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a method for increasing lipid accumulation in liver cells in an individual in need thereof, comprising administering to the individual a therapeutically effective amount of sDSS1 protein or a fragment or variant thereof. In some specific embodiments, the sDSS1 protein or a fragment or variant thereof has at least 80%, 85%, 90%, 95%, 98%, or 100% sequence identity with the sequence as shown in SEQ ID NO: 1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a method for reducing the amount of circulating oxidized LDL in the blood vessels of an individual, comprising administering to the individual an effective amount of sDSS1 protein or a fragment or variant thereof, wherein the sDSS1 protein or a fragment or variant thereof can form a complex with free oxidized LDL. In some embodiments, the method reduces the amount of free uncomplexed oxidized LDL and the amount of total oxidized LDL. In some specific embodiments, the sDSS1 protein or a fragment or variant thereof has at least 80%, 85%, 90%, 95%, 98%, or 100% sequence identity with the sequence as shown in SEQ ID NO: 1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a method for reducing plaque formation in the blood vessels of an individual, comprising administering to the individual an effective amount of sDSS1 protein or a fragment or variant thereof, wherein the sDSS1 protein or a fragment or variant thereof can form a complex with free oxidized LDL. In some specific embodiments, the blood vessel is an artery. In some specific embodiments, the blood vessel is an aorta. In some specific embodiments, the sDSS1 protein or a fragment or variant thereof has at least 80%, 85%, 90%, 95%, 98%, or 100% sequence identity with the sequence as shown in SEQ ID NO: 1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and derivatives thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a method for sequestering circulating free oxidized LDL in blood vessels in the form of a protein-lipid complex, comprising exposing the oxidized LDL to the protein to form the protein-lipid complex in the blood vessels, wherein the protein is sDSS1 protein or a fragment or variant thereof. In some specific embodiments, the sDSS1 protein or a fragment or variant thereof has at least 80%, 85%, 90%, 95%, 98%, or 100% sequence identity with the sequence as shown in SEQ ID NO: 1. In some specific embodiments, the sDSS1 protein or a fragment or variant thereof comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof comprises non-natural amino acids. In some specific embodiments, the non-natural amino acids comprise hydroxyproline, hydroxylysine, selenocysteine, D-amino acids, or synthetic non-natural amino acids and a derivative thereof. In some specific embodiments, the sDSS1 protein or a fragment or variant thereof comprises an amino acid sequence as shown in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14. In some specific embodiments, the sDSS1 protein or a fragment or variant thereof comprises a fragment having at least 80%, 85%, 90%, 95%, 98%, or 100% sequence identity with the sequence as shown in SEQ ID NO: 17 and a fragment having at least 80%, 85%, 90%, 95%, 98%, or 100% sequence identity with the sequence as shown in SEQ ID NO: 18.

In another aspect, provided herein is a complex of sDSS1 protein or a fragment or variant thereof and lipids.

In another aspect, provided herein is a method for screening a therapeutic agent for the treatment of atherosclerosis or atherosclerosis-related diseases in an individual in need thereof, comprising contacting the therapeutic agent with sDSS1 protein, the gene of the sDSS1 protein, the regulatory elements of the sDSS1 gene and the transcription product of the sDSS1 gene, and evaluating the effect of the therapeutic agent on the expression of the sDSS1 protein.

For example, the following technical solutions are provided herein:

an application of a protein in the preparation of drugs for the prevention and treatment of atherosclerosis or atherosclerosis-related cardiovascular and cerebrovascular diseases and peripheral vascular diseases, characterized in that the application is to use sDSS1 protein for the preparation of drugs for the prevention and treatment of atherosclerosis or atherosclerosis-related cardiovascular and cerebrovascular diseases and peripheral vascular diseases.

In some specific embodiments, the atherosclerosis refers to the appearance of lipid streaks or atherosclerotic plaques caused by lipid accumulation in arterial vessel walls, leading to dysfunction of arterial vessels.

In some specific embodiments, the lipid refers to one or more of cholesterol, cholesterol ester, triglyceride, chylomicron (CM), low-density lipoprotein (LDL), very low-density lipoprotein (VLDL), intermediate density lipoprotein (IDL), lipoprotein (a) (Lp(a)), high density lipoprotein (HDL), oxidized low-density lipoprotein (oxLDL) and the respective metabolic intermediate thereof in the blood.

In some specific embodiments, the dysfunction of arterial vessels refers to vascular inner diameter stenosis, vascular outer diameter dilation, decreased vasoconstriction and vasodilatation capacity, decreased vascular elasticity, increased vascular fragility, angiolithic degeneration or calcinosis, and thrombus-induced reduction in blood supply capacity of blood vessels.

In some specific embodiments, the atherosclerosis-related cardiovascular diseases refer to hypertension, angina pectoris, myocardial infarction, myocardium blood-supply insufficiency, arrhythmia, and sudden death.

In some specific embodiments, the atherosclerotic-related cerebrovascular diseases refer to cerebral blood supply insufficiency, cerebral ischemic stroke, and cerebral atrophy.

In some specific embodiments, the atherosclerosis-related peripheral vascular diseases refer to renal insufficiency, renal artery stenosis, paralytic ileus, or acral ischemic necrosis.

In some specific embodiments, the sDSS1 protein comprises a basic protein formed by sDSS1 protein sequence of any one of *Homo sapiens, Pan troglodytes, Pan paniscus, Gorilla, Orangutan, Nomascus leucogenys, Rhinopithecus roxellana, Macaca mulatta, Rhinopithecus bieti, Papio anubis, Colobus angolensis, Cercocebus atys, Mandrillus leucophaeus,* and *Macaca leonina,* wherein the amino acid sequence of *Homo sapiens* sDSS1 is set forth as SEQ ID NO:1, the amino acid sequence of *Pan troglodytes* sDSS1 is set forth as SEQ ID NO: 2, the amino acid sequence of *Pan paniscus* sDSS1 is set forth as SEQ ID NO: 3, the amino acid sequence of *Gorilla* sDSS1 is set forth as SEQ ID NO: 4, the amino acid sequence of *Orangutan* sDSS1 is set forth as SEQ ID NO: 5, the amino acid sequence of *Nomascus leucogenys* sDSS1 is set forth as SEQ ID NO: 6, the amino acid sequence of *Rhinopithecus roxellana* sDSS1 is set forth as SEQ ID NO: 7, the amino acid sequence of *Macaca mulatta* sDSS1 is set forth as SEQ ID NO: 8, the amino acid sequence of *Rhinopithecus bieti* sDSS1 is set forth as SEQ ID NO: 9, the amino acid sequence of *Papio anubis* sDSS1 is set forth as SEQ ID NO: 10, the amino acid sequence of *Colobus angolensis* sDSS1 is set forth as SEQ ID NO: 11, the amino acid sequence of *Cercocebus atys* sDSS1 is set forth as SEQ ID NO: 12, the amino acid sequence of *Mandrillus leucophaeus* sDSS1 is set forth as SEQ ID NO: 13, and the amino acid sequence of *Macaca leonina* sDSS1 is set forth as SEQ ID NO: 14.

In some specific embodiments, the sDSS1 protein is any first protein having more than 70% similarity to the sDSS1 protein as described in the aforementioned embodiments.

In some specific embodiments, the sDSS1 protein is any second protein based on the 58 amino acids at the N-terminus of the sDSS1 protein as described in the aforementioned embodiments, fused to other polypeptide fragments at the N-terminus or C-terminus, with the structural characteristics or amino acid sequence characteristics of the polypeptide fragments used for fusion the same as or similar to the 31 sequences at the C-terminus of the sDSS1 protein as described in the aforementioned embodiments.

In some specific embodiments, the sDSS1 protein is any third protein based on the 58 amino acids at the N-terminus of the sDSS1 protein as described in the aforementioned embodiments, fused to other amino acid fragments at the N-terminus or C-terminus, with the fused protein enabling the transmembrane transport function.

In some specific embodiments, the sDSS1 protein is a fusion protein formed by ligation of the basic protein, the first protein, the second protein, or the third protein to the protein itself, carrier protein, antibody or other amino acid fragments of any length.

In some specific embodiments, the sDSS1 protein is a polypeptide/protein modifier produced by the modification based on the basic protein, the first protein, the second protein, the third protein, or the fusion protein.

In some specific embodiments, the polypeptide/protein modifier is chemically modified for amino groups on amino acid side chains, carbonyl groups on amino acid side chains, nitrogen-terminal amino groups, carbon-terminal carbonyl groups, cysteine, tyrosine, serine and tryptophan at 1-20 sites either specifically or non-specifically.

In some specific embodiments, the modification method of the polypeptide/protein modifier comprises one or more than one of glycosylation modification, fatty acid modification, acylation modification, Fc fragment fusion, albumin fusion, pegylation modification, dextran modification, heparin modification, polyvinylpyrrolidone modification, polyamino acid modification, polysialic acid modification, chitosan and its derivative modification, lectin modification, sodium alginate modification, carbomer modification, polyvinylpyrrolidone modification, hydroxypropyl methylcellulose modification, hydroxypropyl cellulose modification, acetylation modification, formylation modification, phosphorylation modification, methylation modification, sulfonation modification, and other pharmaceutically available polypeptide/protein modification modification methods.

In some specific embodiments, the sDSS1 protein is a non-natural amino acid substitute protein with substitutions performed at 1 to 31 arbitrary amino acid sites using amino acids other than the 20 basic amino acids based on the amino acid sequence of the basic protein, the first protein, the second protein, the third protein, or the fusion protein.

In some specific embodiments, the amino acid substitutions of the non-natural amino acid substitute protein comprise hydroxyproline, hydroxylysine, selenocysteine, D-amino acids, synthetic non-natural amino acids and derivatives thereof.

In some specific embodiments, the sDSS1 protein is a partial or full complex formed by the basic protein, the first protein, the second protein, the third protein, the fusion protein, the polypeptide/protein modifier or the non-natural amino acid substitute and a pharmaceutically applicable drug carrier.

In some specific embodiments, the drug carrier of the complex comprises one or more than one of an enteric coated formulation, a capsule, a micro-sphere/-capsule, a liposome, a microemulsion, a composite emulsion, a nanoparticle, a magnetic particle, gelatin and gel.

In some specific embodiments, the sDSS1 protein targets the individual's own sDSS1 protein, and the level of the individual's own sDSS1 protein is affected by an exogenous drug.

In some specific embodiments, the drug uses the sDSS1 protein, the gene of the sDSS1 protein, the regulatory elements of the sDSS1 gene, and the transcription product of the sDSS1 gene as the targets of the drug.

In some specific embodiments, the drug regulates the amount of the sDSS1 protein in blood, cerebrospinal fluid or lymphatic fluid by affecting protease/peptidase activity in blood, cerebrospinal fluid or lymphatic fluid.

In some specific embodiments, the drug is a first drug formed by a chemical small molecular drug, an antibody, a polypeptide/protein drug, a nucleic acid drug, or a nano-drug.

In some specific embodiments, the sDSS1 protein is a second drug formed by a combination of two or more components of any one of the basic protein, the first protein, the second protein, the third protein, the fusion protein, the polypeptide/protein modifier, the complex, and the first drug.

In some specific embodiments, the sDSS1 protein is a third drug formed by one, two or more components of any one of the basic protein, the first protein, the second protein, the third protein, the fusion protein, the polypeptide/protein modifier, the complex, and the first drug with a pharmaceutically available excipient.

In some specific embodiments, the sDSS1 protein is a fourth drug obtained by introducing in vivo and expressing through an expression system the nucleotide sequence encoding the basic protein, the first protein, the second protein, the third protein or the fusion protein.

In some specific embodiments, the expression system is a eukaryotic expression plasmid vector, adenovirus, adeno-associated virus, lentivirus, retrovirus, baculovirus, herpes virus, pseudorabies virus, ZFN gene editing technology, TALEN Gene editing technology, CRISPR/Cas gene editing technology and other medically available gene editing technologies or viral vectors.

In some specific embodiments, the sDSS1 protein is a fifth protein formed by the basic protein, the first protein, the second protein, the third protein, or the fusion protein obtained by transplanting cells in the individual.

In some specific embodiments, the cell is any one of a stem cell, a precursor cell or an adult cell of humans.

In some specific embodiments, the stem cell is an embryonic stem cell, an induced pluripotent stem cell, a cell obtained by transdifferentiation, or a stem cell derived from a primary culture, a pluripotent or unipotent stem cell differentiated from a parent cell.

In some specific embodiments, the sDSS1 protein is a sixth protein introduced into the individual by infusion of serum, cerebrospinal fluid, lymphatic fluid or interstitial fluid.

In some specific embodiments, the sDSS1 protein is a seventh protein formed by the basic protein, the first protein, the second protein, the third protein, or the fusion protein obtained by transplanting tissues or organs in the individual.

In some specific embodiments, the tissue is a whole organ or a partial tissue mass of a brain, liver, kidney, spleen or pancreatic islets, or blood, fat, muscle, bone marrow or skin.

In some specific embodiments, the preventive drug is one or more of protein drugs, polypeptide drugs, nucleic acid drugs, chemical small molecular drugs, cell products, commercial transplantation tissues, injections, freeze-dried powder, health care products, and food additives comprising the basic protein, any one of the first to the seventh proteins, the fusion protein, the polypeptide/protein modifier, the non-natural amino acid substitute protein, the complex, drug combination, expression system, cell, tissue, organ, body fluid or interstitial fluid.

In some specific embodiments, the therapeutic drug is one or more of protein drugs, polypeptide drugs, nucleic acid drugs, chemical small molecular drugs, cell products, commercial transplantation tissues, injections, freeze-dried powder, health care products, and food additives comprising the basic protein, any one of the first to the seventh proteins, the fusion protein, the polypeptide/protein modifier, the non-natural amino acid substitute protein, the complex, the first drug, the second drug, the third drug, expression system, cell, tissue, organ, body fluid or interstitial fluid.

The features and/or beneficial effects of the present invention include:

1. The sDSS1 protein provided by the present invention has the ability to bind to oxLDL and LDL in vitro;
2. The sDSS1 protein provided by the present invention can inhibit the uptake of oxLDL by human umbilical vein endothelial cells (HUVECs);
3. The sDSS1 protein provided by the present invention can inhibit the phagocytosis of oxLDL by macrophages differentiated from monocyte THP-1;
4. The sDSS1 protein provided by the present invention can increase the uptake of oxLDL by hepatocyte HepG2;
5. The sDSS1 protein provided by the present invention can reduce the level of oxLDL/LDL ratio in model animals;
6. The sDSS1 protein provided by the present invention can reduce the area of atherosclerotic plaques in model animals and inhibit the progression of atherosclerosis.
7. The sDSS1 protein provided by the present invention is a protein possessed by humans and other primates, it has a relatively small molecular weight, low immunogenicity, and a natural protein degradation mechanism in vivo. Therefore, the clinical application thereof will not cause obvious immune responses or other side effects, which is safe and reliable.

In summary, the present invention provides a sDSS1 protein drug for the prevention and treatment of atherosclerosis and atherosclerosis-related cardiovascular and cerebrovascular diseases and peripheral vascular diseases. As verified by experiments at the molecular, cellular and animal levels, SDSS1 protein can bind to LDL or oxLDL protein to form a complex, the addition of sDSS1 protein to a culture medium reduces the uptake of oxLDL by vascular endothelial cells and mononuclear macrophages, and increases the uptake of oxLDL by hepatocytes. In animal experiments, sDSS1 protein can effectively reduce the level of oxidized low-density lipoprotein in atherosclerosis model mice, reduce the area of atherosclerotic plaques, and inhibit the progression of atherosclerosis. The sDSS1 protein has lower protein immunogenicity and significant pharmaceutical effect, and has the potential for clinical use in the prevention and treatment of atherosclerosis and atherosclerosis-related cardiovascular and cerebrovascular diseases and peripheral vascular diseases.

BRIEF DESCRIPTION OF THE DRAWINGS

The present invention will be further described below in detail with reference to the accompanying drawings, which are intended to make the present invention clear and complete, but are not to limit the protection scope of the present invention.

FIG. 1A. In sodium acetate/acetic acid buffer (pH 4.5), oxLDL or LDL was incubated with sDSS1 protein for 12 hours. The incubation product was separated by SDS-PAGE and stained with Coomassie brilliant blue. The results show that the molecular weight of LDL protein (L1), oxLDL protein (L2) band alone is about 70 KD, and the molecular weight of sDSS1 band (L3, L6) alone is about 15 KD. Co-incubation of LDL or oxLDL with sDSS1 protein resulted in interactions. (L4 and L7 correspond to LDL and sDSS1 protein, and L5 and L8 correspond to oxLDL and sDSS1 protein).

On the SDS-PAGE gel, after reacting with sDSS1 protein, the oxLDL protein or LDL protein (molecular weight about 70 KD) band in the reaction system becomes significantly lighter; as the concentration of sDSS1 protein in the reaction system increased, more complexes were formed by LDL or oxLDL, and the band becomes darker.

Figure 1A:
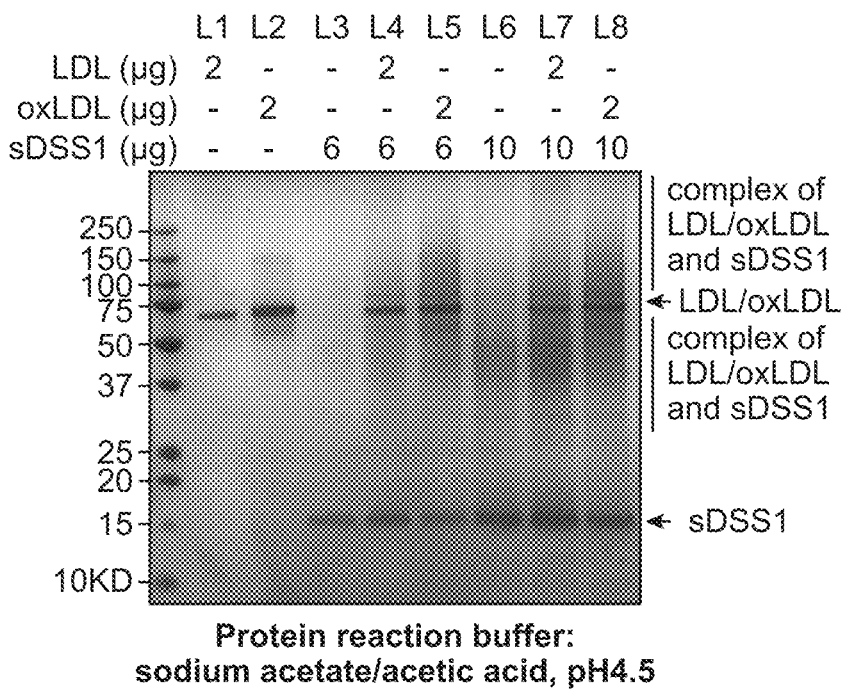
FIGS. 1A-1D. Molecular experiments showed that sDSS1 protein can interact with oxLDL and LDL.
Figure 1B:
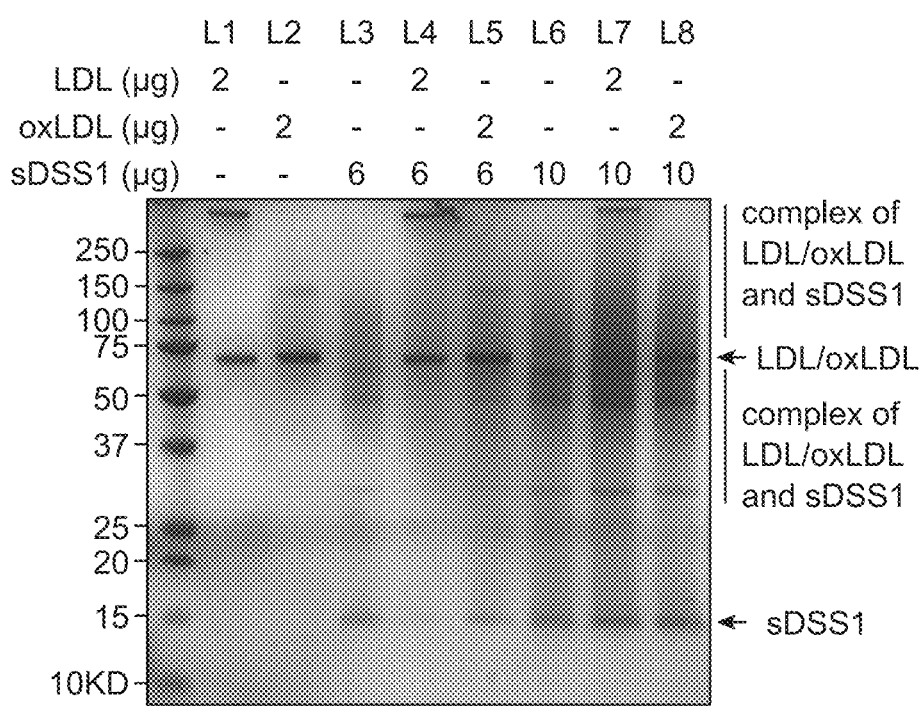

FIG. 1B. In phosphate buffer (pH 7.2), oxLDL or LDL was incubated with sDSS1 protein for 12 hours. The incubation product was separated by SDS-PAGE and stained with Coomassie brilliant blue. The results show that the molecular weight of LDL protein (L1), oxLDL protein (L2) band alone is about 70 KD, and the molecular weight of sDSS1 band (L3, L6) alone is about 15 KD. Co-incubation of LDL or oxLDL with sDSS1 protein resulted in interactions. (L4 and L7 correspond to LDL and sDSS1 protein, and L5 and L8 correspond to oxLDL and sDSS1 protein).

On the SDS-PAGE gel, after reacting with sDSS1 protein, the oxLDL protein or LDL protein (molecular weight about 70 KD) band in the reaction system didn't significantly change; as the concentration of sDSS1 protein in the reaction system increased, more complexes were formed by LDL or oxLDL, and the bands becomes darker.

Figure 1C:
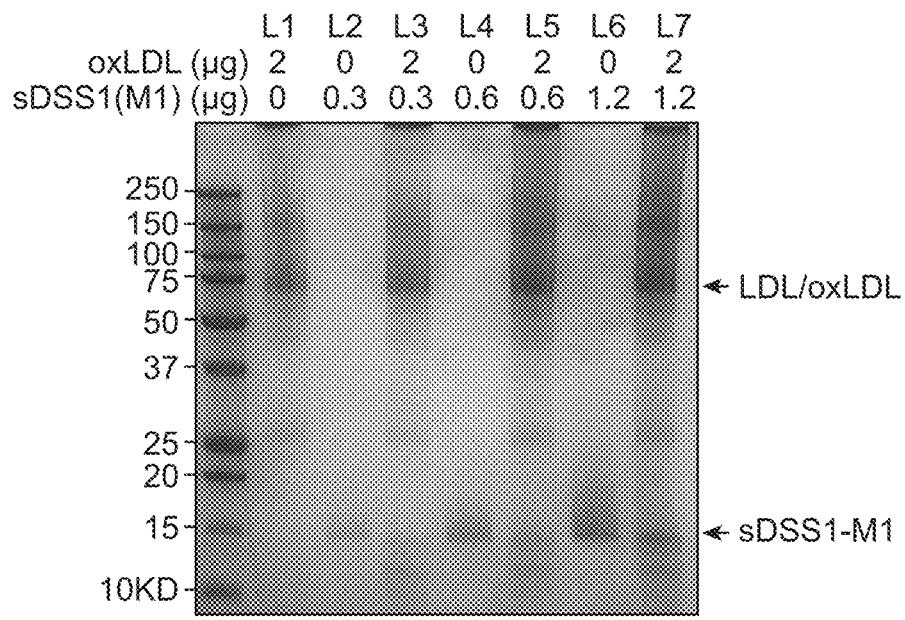
Figure 1D:
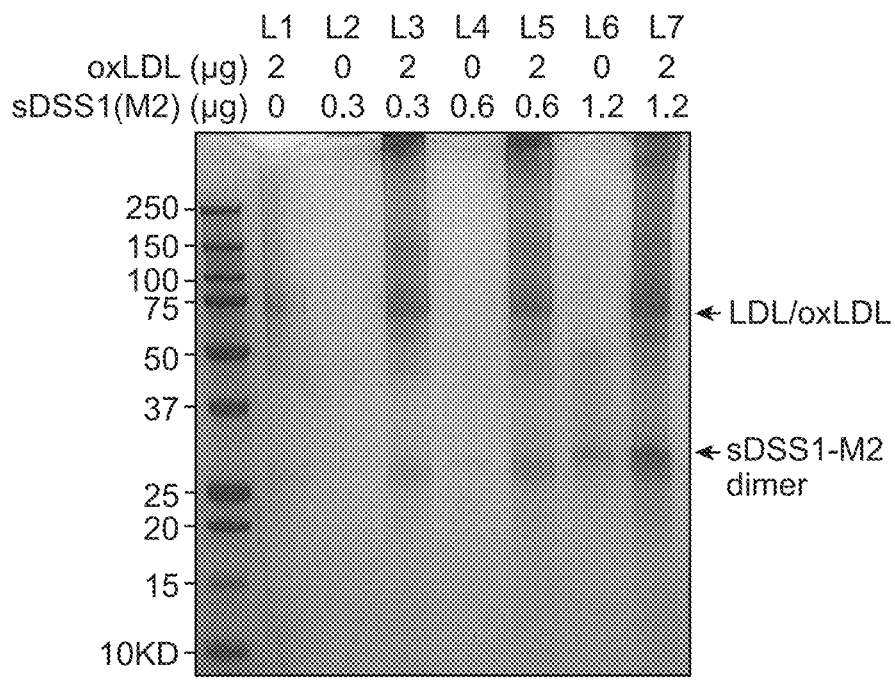

FIG. 1C, FIG. 1D. In phosphate buffer (pH7.2), oxLDL was incubated with sDSS1-M1 or sDSS1-M2, respectively. The product was separated by SDS-PAGE and stained with Coomassie brilliant blue. The results show that when oxLDL was incubated with sDSS1-M1, the sDSS1-M1 protein interacted with the oxLDL protein in the reaction system on the SDS-PAGE gel, forming obvious diffuse bands (L3, L5, L7) in the high molecular weight region (>75 KD) and the 37 KD-75 KD region, while the sDSS1-M1 protein band in the reaction system becomes obviously lighter (L2 vs. L3, L4 vs. L5, L6 vs. L7) (FIG. 1C). When oxLDL was incubated with sDSS1-M2, the sDSS1-M2 protein appeared as a dimer (L2, L4, L6), interacts with the oxLDL protein, forming obvious diffuse bands (L3, L5, L7) in the high molecular weight region (>75 KD) and the 37 KD-75 KD region (FIG. 1D). In these two reaction systems, as the concentration of sDSS1-M1 or sDSS1-M2 protein in the reaction system increased, more complexes were formed in the reaction system, and the bands becomes darker.

FIGS. 2A-2F, 3A-3C, and 4. The sDSS1 protein can inhibit the uptake of oxLDL by endothelial cells.

FIGS. 2A-2F. 10 μg/ml Dil-oxLDL was added to the culture medium of human umbilical vein endothelial cells (HUVECs) (FIGS. 2A and 2D), or Dil-oxLDL was added along with sDSS1 protein at concentrations of 2 μg/ml (FIGS. 2B and 2E), 5 μg/ml, 10 μg/ml (FIGS. 2C and 2F), and 20 μg/ml. After 5 hours, Dil-oxLDL was taken up by the HUVEC cells. Varying numbers of phagocytic vesicles showing red fluorescence in the cells could be observed under a fluorescence microscope. After adding sDSS1 protein, the fluorescence in the HUVEC cells weakened, and the effect was concentration-dependent.

FIGS. 3A-3C. After the uptake of Dil-oxLDL by HUVEC cells, the fluorescence signals in the cells were detected by flow cytometry, and it was found that as the amount of sDSS1 protein added to the culture medium increased from 2 μg/mL (FIG. 3B) to 10 μg/mL (FIG. 3C), the fluorescence signals of the cells gradually weakened (as compared with FIG. 3A).

FIG. 4. The flow cytometry test results statistically revealed that sDSS1 protein could significantly inhibit the uptake of oxLDL by HUVEC cells compared with control cells (10 μg/ml Dil-oxLDL). Adding 2 μg/ml sDSS1 protein to the culture medium could reduce the uptake of oxLDL by half, and the effect was obviously dose-dependent.

FIGS. 5A-5F and 6A-6C. The sDSS1 protein can inhibit the phagocytosis of oxLDL by macrophages.

FIGS. 5A-5F. After THP-1 cells were induced with 100 nM PMA for 4 days, they differentiate into mature macrophages. 10 μg/ml Dil-oxLDL was added to the culture medium (FIGS. 5A and 5D), or Dil-oxLDL was added along with sDSS1 protein at concentrations of 2 μg/ml (FIGS. 5B and 5E) and 10 μg/ml (FIGS. 5C and 5F). After 5 hours, it was observed that in the control cell group, Dil-oxLDL was phagocytosed by macrophages, and obvious red fluorescent phagocytic vesicles could be observed in the cells. After adding sDSS1 protein, basically no obvious fluorescent signals were observed in the cells.

Figure 6A:
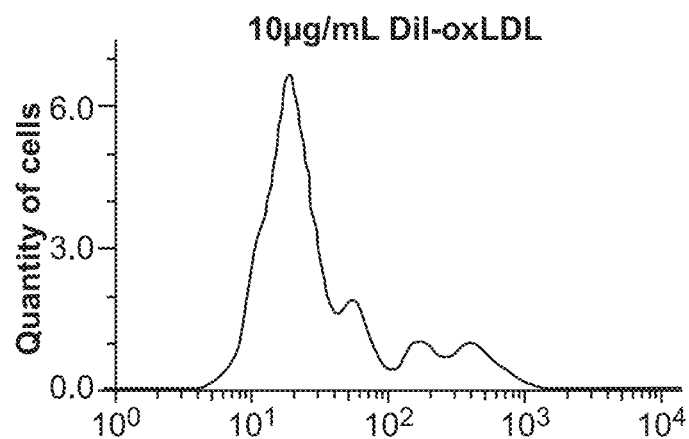
Figure 6B:
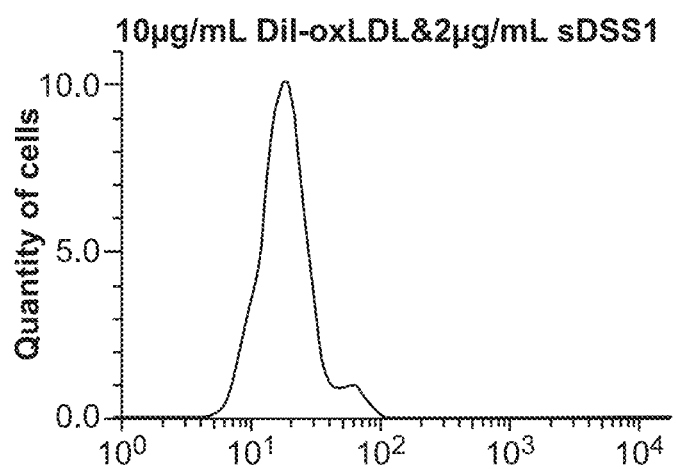
Figure 6C:
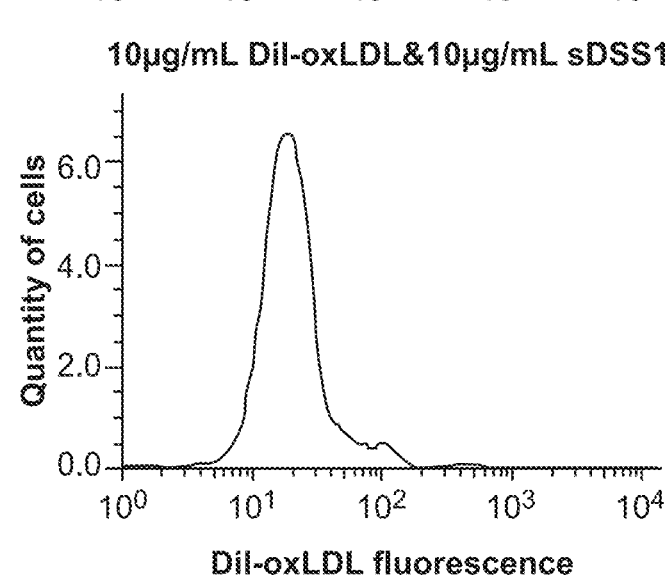

FIGS. 6A-6C. Fluorescence signals of macrophages were detected by flow cytometry. The results showed that cells with fluorescent signals could be detected in the cells in the control group (10 μg/ml Dil-oxLDL) (FIG. 6A), while cells with fluorescent signals basically didn't appear in the cells in the two experimental groups with sDSS1 protein added at 2 μg/mL (FIG. 6B) and 10 μg/mL (FIG. 6C).

FIGS. 7A-7F, 8A-8C, and 9. The sDSS1 protein can increase the uptake ability of oxLDL protein by human hepatocytes.

FIGS. 7A-7F. Fluorescence of the cells was detected by a fluorescence microscope 9 hours after adding Dil-oxLDL to Hep G2 cells. The results show that obvious fluorescence could be observed in the cells in the control group 10 μg/mL Dil-oxLDL (FIGS. 7A and 7D) and the experimental groups: 5 μg/mL sDSS1 (FIGS. 7B and 7E) and 50 μg/mL sDSS1 (FIGS. 7C and 7F). The fluorescence appeared in the phagocytic vesicles of varying numbers, indicating that Hep G2 cells took up Dil-oxLDL.

Figure 8A:
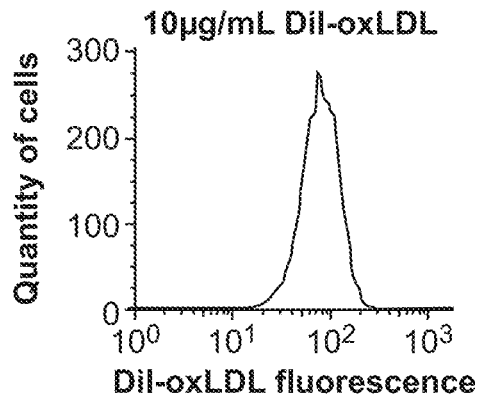
Figure 8B:
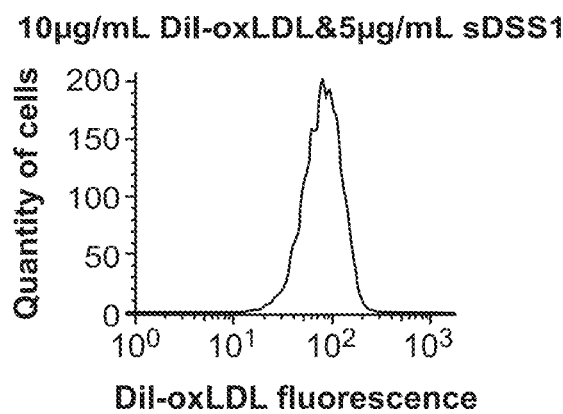
Figure 8C:
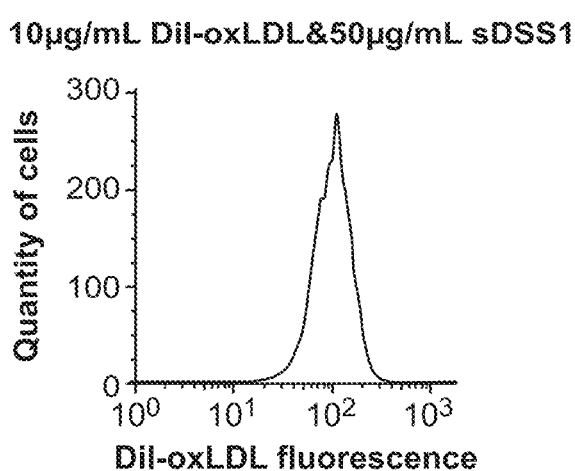

FIGS. 8A-8C. Cell fluorescence values were detected by flow cytometry. It could be seen that obvious Dil fluorescence signal could be detected in the Hep G2 cells in the control group (FIG. 8A). The addition of 5 μg/ml sDSS1 to the culture medium (FIG. 8B) did not significantly affect the intracellular fluorescence level, while the 50 μg/ml sDSS1 protein (FIG. 8C) could significantly increase the intensity of Dil signal in cells.

Figure 9:
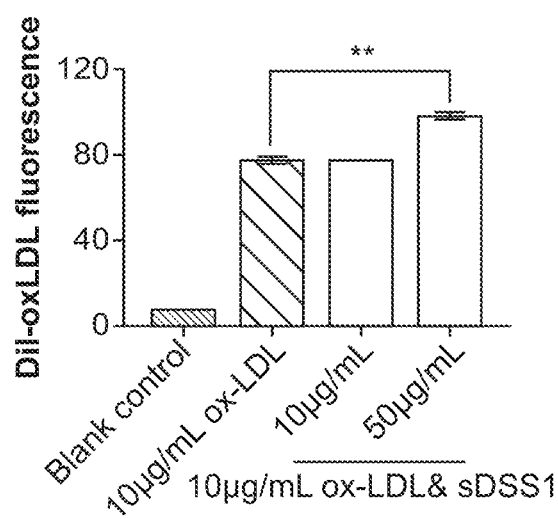

FIG. 9. The statistical detection results by flow cytometry showed that compared with the control group, after adding 50 μg/ml sDSS1 protein to the culture medium, the absorbing ability of oxLDL by Hep G2 cells increased by about 27%, which was significantly improved compared with the control group (**$p<0.01$).

FIGS. 10A-10F and 11. The sDSS1 protein has no significant effect on the uptake ability of LDL protein by human hepatocytes.

FIGS. 10A-10F. Cell fluorescence was detected by a fluorescence microscope 10 hours after adding Dil-LDL to Hep G2 cells. The results showed that obvious fluorescence could be observed in the cells in the control group (FIGS. 10A and 10D) and the experimental groups 5 μg/mL sDSS1 (FIGS. 10B and 10E) and 50 μg/mL sDSS1 (FIGS. 10C and 10F). The fluorescence appeared in the phagocytic vesicles of varying numbers, indicating that Hep G2 cells took up Dil-LDL. The numbers of fluorescent cells were determined, and there was no significant difference.

FIG. 11. Cell fluorescence values were detected by flow cytometry. It could be seen that obvious Dil fluorescence signals could be detected in the Hep G2 cells in the control group. The addition of 5 μg/ml sDSS1 or 50 μg/ml sDSS1 protein to the culture medium could not cause significant changes in the intensity of the Dil fluorescence signals in the cells.

Figure 12:
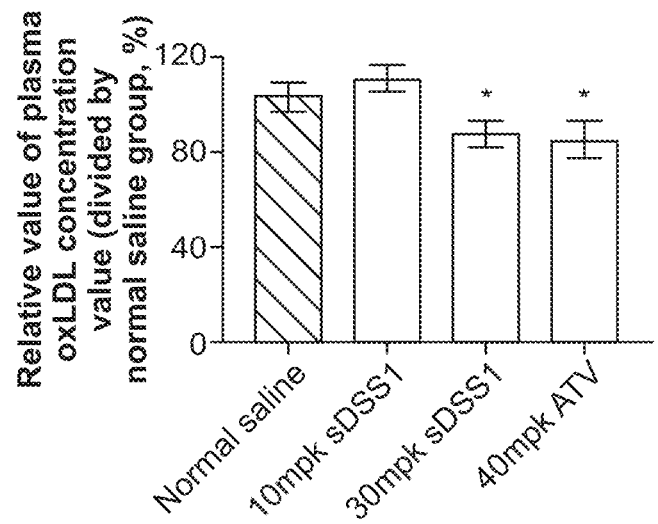
Figure 13:
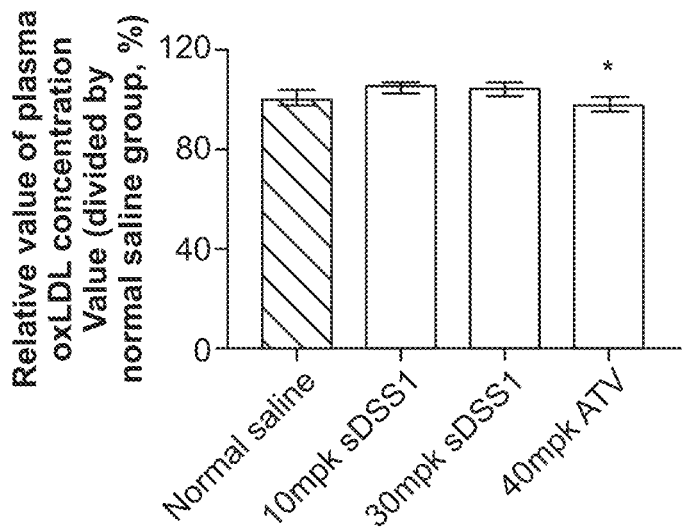
Figure 14:
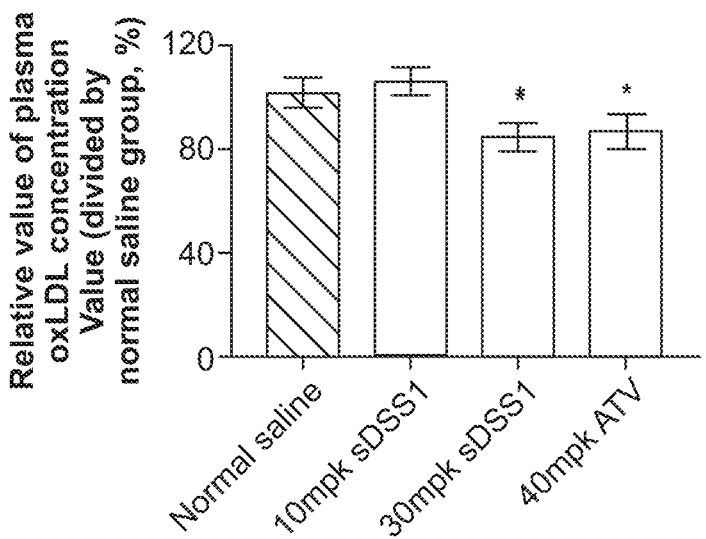

FIGS. 12-14. The sDSS1 protein reduces the plasma oxLDL level and the plasma oxLDL/LDL ratio in mice, and there is no significant difference in the LDL levels.

ApoE−/− mice were divided into two groups, the control group and the sDSS1 protein administration group. The control group was given 200 μl of normal saline once a day by intraperitoneal injection, and the administration group was administered the sDSS1 protein once a day according to 10 mg/kg body weight (10 mpk) or 30 mg/kg body weight (30 mpk) by intraperitoneal injection, and atorvastatin (ATV) as a positive control drug was administered per day according to 40 mg/kg body weight (40 mpk) by intraperitoneal injection for 7 consecutive days. At the end of the administration, the plasma levels of oxLDL and LDL in mice were detected.

FIG. 12. Plasma oxLDL levels were detected, and it was found that after the administration of sDSS1 protein, low-dose injection of sDSS1 protein did not significantly affect the plasma oxLDL level in mice, while high-dose administration significantly reduced the oxLDL level in mice, showing the same efficacy as 40 mpk ATV.

FIG. 13. Plasma LDL levels were detected, and it was found that compared with mice in the control group, injection of sDSS1 protein at 10 mpk or 30 mpk did not cause significant changes in plasma LDL level in mice.

FIG. 14. The plasma oxLDL/LDL ratios were analysed, and the results showed that the plasma oxLDL/LDL ratio of mice in the high-dose sDSS1 protein group was significantly lower than that of the control group, showing similar efficacy to ATV. (*p value<0.05).

Figure 15:
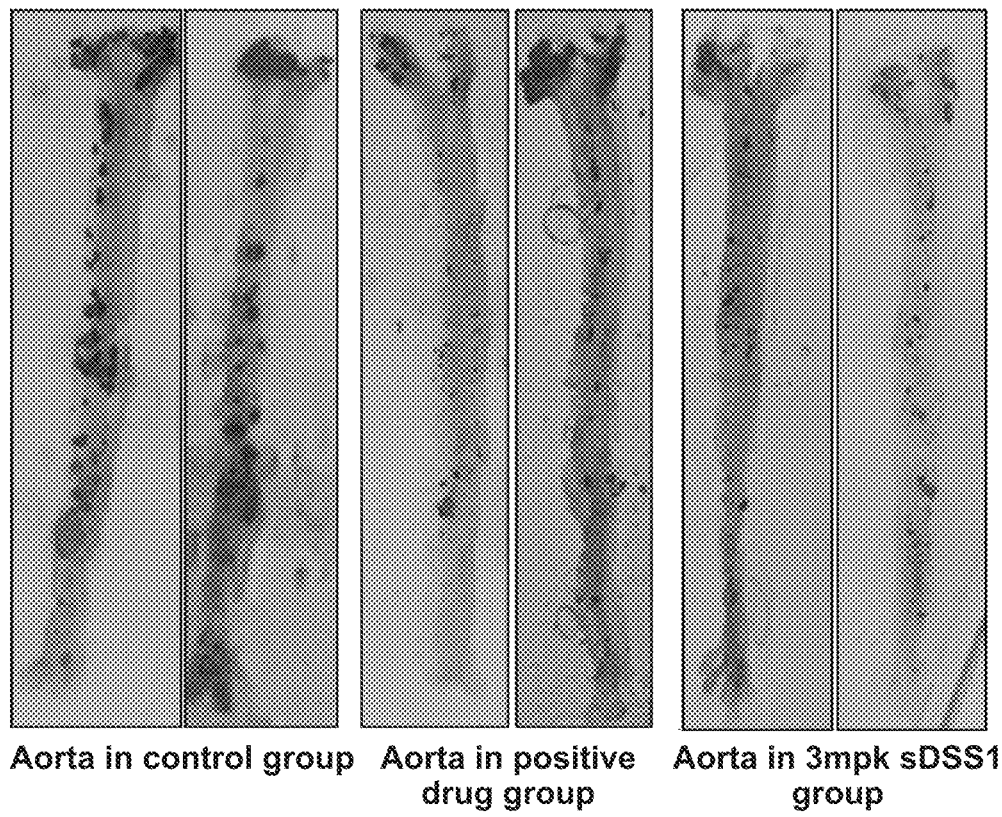
Figure 16:
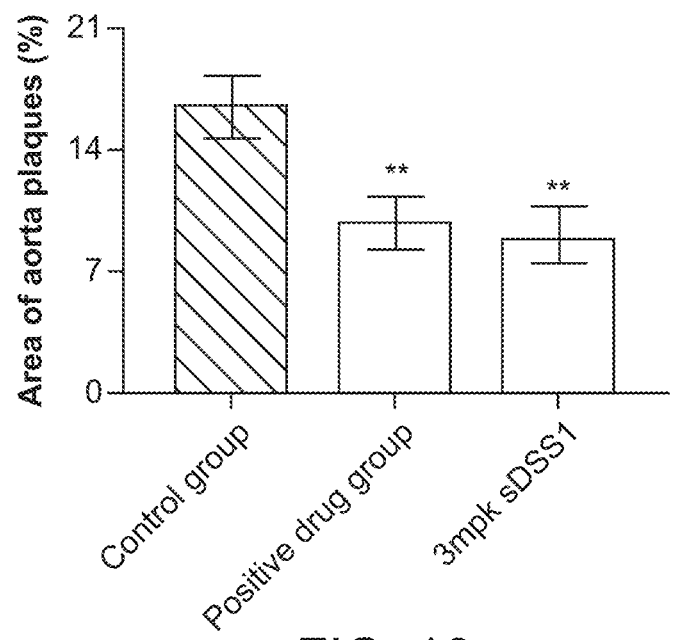

FIGS. 15-16. The sDSS1 protein inhibits the formation of atherosclerotic plaques in ApoE−/− mice. 16-week-old ApoE−/− mice were continuously injected with sDSS1 at 3 mpk or ATV at 40 mpk for 13 consecutive weeks. At the end of the injection, the aorta was dissected for oil red O staining, and the area of plaques was calculated.

FIG. 15. Staining of aorta front (en face) of the ApoE−/− mice showed atherosclerotic plaques. Atherosclerotic plaques were stained by Oil Red O and appeared red-orange, and the areas without plaques were not colored and were transparent. The results show that the area of atherosclerotic plaques of mice in the positive drug group was significantly reduced compared with the model group; the area of atherosclerotic plaques of mice in the sDSS1 protein group was also significantly reduced compared with the model group, and the effect in certain areas was even better than that of the positive drug.

FIG. 16. Oil red O staining area and the total aortic area were measured, and the plaque area ratio was calculated. The plaque area ratio of the positive drug group and the sDSS1 protein group were significantly smaller than that of the model group (**$p<0.01$), and there was no significant difference in the plaque area ratios between the positive drug group and the sDSS1 protein group.

DETAILED DESCRIPTION OF THE PRESENT INVENTION

Before describing the embodiments of the present invention, it should be understood that these embodiments are only given by way of examples, and various alternatives to the embodiments of the present invention described herein can be used to implement the present invention. Numerous variations, modifications and substitutions will occur to those skilled in the art without departing from the present invention.

Unless otherwise defined, all technical and scientific terms used herein have the same meaning as commonly understood by those of ordinary skill in the art to which the present invention belongs. Although methods and materials similar or equivalent to those described herein can be used in the practice or testing of the present invention, suitable methods and materials are described below. In case of conflict, the patent specification (including definitions) of the present invention shall prevail. In addition, the materials, methods, and examples are illustrative only and not intended to be limiting. Numerous variations, modifications and substitutions will occur to those skilled in the art without departing from the present invention.

As used in this specification and claims, the singular forms "a", "an" and "the" include plural references unless the context clearly dictates otherwise.

The terms "polypeptide", "peptide" and "protein" are used interchangeably herein to refer to amino acid polymers of any length. The polymer can be linear or branched, it can include modified amino acids, and it can be interrupted by non-amino acids. The term also encompasses amino acid polymers that have been modified by, for example, disulfide bond formation, glycosylation, lipidation, acetylation, phosphorylation, or any other manipulation (such as coupling with a labeling component).

The term "amino acid" refers to natural and/or non-natural or synthetic amino acids, including but not limited to D or L optical isomers, as well as amino acid analogs and peptidomimetics. Standard one-letter or three-letter codes are used to designate amino acids.

The term "natural amino acid" means L optical isomer form of glycine (G), proline (P), alanine (A), valine (V), leucine (L), isoleucine (I), methionine (M), cysteine (C), phenylalanine (F), tyrosine (Y), tryptophan (W), histidine (H), lysine (K), arginine (R), glutamine (Q), asparagine (N), glutamic acid (E), aspartic acid (D), serine (S) and threonine (T). The term "non-natural amino acid" includes any amino acid that is not the aforementioned natural amino acids.

A "fragment" when used in a protein is a truncated form of a natural biologically active protein, which may or may not retain at least a portion of the therapeutic and/or biological activity. A "variant" when used in a protein is a protein that has sequence homology to a natural biologically active protein, which retains at least a portion of the therapeutic and/or biological activity of the biologically active protein. For example, the variant protein may share at least 70%, 75%, 80%, 85%, 90%, 95%, 96%, 97%, 98%, or 99% amino acid sequence identity compared to the reference biologically active protein. As used herein, the term "biologically active protein portion" includes, for example, proteins that are intentionally modified by site-directed mutagenesis, synthesis of coding genes, insertion, or accidentally modified by mutation.

The terms "polynucleotide", "nucleic acid", "nucleotide" and "oligonucleotide" are used interchangeably. They refer to a polymerized form of nucleotides of any length, either deoxyribonucleotides or ribonucleotides, or the analogs thereof. A polynucleotide can have any three-dimensional structure, and can perform any known or unknown function. The following are non-limiting examples of polynucleotides: coding or non-coding regions of genes or gene fragments, loci determined by linkage analysis, exons, introns, messenger RNA (mRNA), transfer RNA, ribosomal RNA, ribozymes, cDNAs, recombinant polynucleotides, branched polynucleotides, plasmids, vectors, isolated DNAs of any sequence, isolated RNAs of any sequence, nucleic acid probes and primers. Polynucleotides may include modified nucleotides, such as methylated nucleotides and nucleotide analogs. If present, modifications to the nucleotide structure can be imparted before or after polymer assembly. The sequence of nucleotides can be interrupted by non-nucleotide components. The polynucleotide can be further modified after polymerization, for example by coupling with a labeling component.

With regard to the polypeptide sequence determined herein, "percentage of sequence identity (%)" is defined as the percentage of amino acid residues that are identical to the amino acid residues of the second, reference polypeptide sequence or part thereof in the query sequence after aligning the sequences and if necessary introducing gaps to obtain the maximum percentage of sequence identity, and not considering any conservative substitutions as the part of sequence identity. The alignment aimed at determining the percentage of amino acid sequence identity can be achieved in various ways within the technology of the art, such as using publicly available computer softwares, such as BLAST, BLAST-2, ALIGN, NEEDLE or Megalign (DNASTAR) software. Those skilled in the art can determine the appropriate parameters for measuring the alignment, including any algorithm needed to obtain the maximum alignment over the full length of the sequence being compared. The percentage of identity can be measured over the length of the entire defined polynucleotide sequence, or it can be measured over a shorter length, for example, the length of a fragment taken from a larger, defined polynucleotide sequence, the fragment is, for example, a fragment of at least 15, at least 20, at least 30, at least 40, at least 50, at least 70, or at least 150 consecutive residues. These lengths are only exemplary, and it should be understood that any fragment length supported by the sequences shown in the tables, drawings, or sequence listing herein can be used to describe the length over which the percentage of identity can be measured.

A "vector" is a nucleic acid molecule that preferably replicates itself in a suitable host, which transfers the inserted nucleic acid molecule into and/or between host cells. The term includes vectors that mainly play the role of inserting DNAs or RNAs into cells, vector replication that mainly plays the role of DNA or RNA replication, and expression vectors that play the role of DNA or RNA transcription and/or translation. It also includes vectors that provide more than one of the above-mentioned effects. An "expression vector" is a polynucleotide that can be transcribed and translated into a polypeptide when introduced into a suitable host cell. An "expression system" generally means a suitable host cell that contains an expression vector that can be used to produce a desired expression product.

The term "effective amount" or "therapeutically effective amount" refers to an amount of the compound described herein sufficient to achieve the intended application (including but not limited to the treatment of a disease) as defined below. The therapeutically effective amount may vary according to the intended application (in vitro or in vivo) or the subject to be treated and disease condition, for example, the weight and age of the subject, the severity of the disease condition, the routes of administration, etc., which can be easily determined by a person of ordinary skill in the art. The term also applies to the dosage that will induce a specific response in the target cell, for example target gene induction and/or apoptosis. The specific dosage will vary depending on the particular compound selected, the dosing regimen to be followed, whether it is administered in combination with other compounds, the timing of administration, the tissue to be administered, and the physical delivery system that carries it.

As used herein, "treatment" or "treating" or "alleviating" or "improving" are used interchangeably herein. These terms refer to methods used to obtain beneficial or desired results, including but not limited to therapeutic benefits and/or preventive benefits. The so-called therapeutic benefit means the eradication or improvement of the underlying conditions being treated. In addition, therapeutic benefits are also obtained as follows: one or more of the physiological symptoms associated with the underlying conditions are eradicated or improved, so that improvement is observed in the subject, although the subject may still be afflicted by the underlying conditions. As for the preventive benefits, the composition can be administered to subjects having a risk of developing a particular disease or who have reported one or more physiological symptoms of the disease, even though the diagnosis of the disease may not have been made.

As used herein, the term "therapeutic effect" encompasses the therapeutic benefits and/or preventive benefits described above. Preventive effects include delaying or eliminating the occurrence of a disease or condition, delaying or eliminating the onset of symptoms of a disease or condition, slowing, stopping or reversing the progression of a disease or condition, or any combination thereof.

"Medicament" or "therapeutic agent" refers to a biological, pharmaceutical or chemical compound or other moieties. Non-limiting examples include simple or complex organic or inorganic molecules, peptides, proteins, oligonucleotides, antibodies, antibody derivatives, antibody fragments, vitamin derivatives, carbohydrates, toxins, or chemotherapeutic compounds. Various compounds can be synthesized based on various core structures, for example, small molecules and oligomers (such as oligopeptides and oligonucleotides) and synthetic organic compounds. In addition, various natural sources can provide compounds for screening, such as plant or animal extracts, etc.

The term "in vivo" refers to an event that occurs inside a subject.

The term "in vitro" refers to an event that occurs outside a subject. For example, in vitro test covers any test run in addition to a subject test. In vitro test covers a cell-based test in which live or dead cells are used. In vitro test also covers a cell-free test, in which intact cells are not used.

Shfm1 (split hand/split foot malformation type 1) gene is one of the key genes in human crab claw disease and is highly conserved in evolution. The DSS1 protein encoded by it is involved in the processes such as stabilization of genome, recombination of homologous gene, repairing of DNA damage and cell proliferation [22-26]. The inventor's research results show that DSS1 protein as a tag can be added to oxidized protein through an energy-consuming enzymatic reaction to help cells remove oxidized protein [27]. These results show the important role of DSS1 protein in biological activities.

The sequence of human sDSS1 protein is as shown in SEQ ID NO:1. In some specific embodiments, the sDSS1 protein or a fragment or variant thereof as described herein has at least 80%, 85%, 90%, 95%, 98%, or 100% sequence identity with the sequence as shown in SEQ ID NO:1. In some specific embodiments, the sDSS1 protein or a fragment or variant thereof as described herein comprises insertion, deletion or substitution of no more than 10, 9, 8, 7, 6, 5, 4, 3, 2 or 1 amino acid(s) compared with the sequence as shown in SEQ ID NO: 1. In some specific embodiments, the sDSS1 protein or a fragment or variant thereof as described herein comprises substitution of no more than 10, 9, 8, 7, 6, 5, 4, 3, 2 or 1 amino acid(s). In some specific embodiments, the sDSS1 protein or a fragment or variant thereof as described herein comprises substitution of 10, 9, 8, 7, 6, 5, 4, 3, 2 or 1 amino acid(s). In some specific embodiments, the sDSS1 protein or a fragment or variant thereof as described herein comprises substitution of 10, 9, 8, 7, 6, 5, 4, 3, 2 or 1 amino acid(s), wherein the substitution means that cysteine is substituted with phenylalanine. In some specific embodiments, the sDSS1 protein or a fragment or variant thereof as described herein comprises non-natural amino acids. In some specific embodiments, the non-natural amino acids as described herein comprise hydroxyproline, hydroxylysine, selenocysteine, D-amino acids, or synthetic non-natural amino acids, and derivatives thereof.

In some specific embodiments, the sDSS1 protein or a fragment or variant thereof as described herein comprises a sequence having at least 80%, 85%, 90%, 95%, 98%, or 100% sequence identity with the amino acid sequence as shown in in SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, or SEQ ID NO: 14.

In some specific embodiments, the sDSS1 protein or a fragment or variant thereof as described herein comprises a fragment having at least 80%, 85%, 90%, 95%, 98%, or 100% sequence identity with the sequence as shown in SEQ ID NO: 17, and a fragment having at least 80%, 85%, 90%, 95%, 98%, or 100% sequence identity with the sequence as shown in SEQ ID NO: 18.

In some specific embodiments, the sDSS1 protein or a fragment or variant thereof as described herein comprises a fusion polypeptide of the sDSS1 protein or a fragment or variant thereof as described herein and other functional polypeptides. In some specific embodiments, the functional polypeptide can facilitate transmembrane transport of the sDSS1 protein or a fragment or variant thereof. In some specific embodiments, the functional polypeptide can facilitate the stability of the sDSS1 protein or a fragment or variant thereof. In some specific embodiments, the functional polypeptide can facilitate the combination of the sDSS1 protein or a fragment or variant thereof with the target molecule to form a complex. In some specific embodiments, the functional polypeptide can facilitate the combination of the sDSS1 protein or a fragment or variant thereof with oxLDL. In some specific embodiments, the functional polypeptide can inhibit the uptake of the sDSS1 protein or a fragment or variant thereof oxLDL by vascular endothelial cells or macrophages. In some specific embodiments, the functional polypeptide can facilitate the uptake of the sDSS1 protein or a fragment or variant thereof oxLDL by liver tissue or hepatocytes.

In some specific embodiments, the sDSS1 protein or a fragment or variant thereof as described herein comprises chemical modifications on 1 to 20 amino acids. In some specific embodiments, the chemical modification comprises amino or glycosylation modification, fatty acid modification, acylation modification, Fc fragment fusion, albumin fusion, polyethylene glycol (PEG) modification, dextran modification, heparin modification, polyvinylpyrrolidone modification, polyamino acid modification, polysialic acid modification, chitosan and its derivative modification, lectin modification, sodium alginate modification, carbomer modification, polyvinylpyrrolidone modification, hydroxypropyl methylcellulose modification, hydroxypropyl cellulose modification, acetylation modification, formylation modification, phosphorylation modification, methylation modification and/or sulfonation modification. In some specific embodiments, the sDSS1 protein or a fragment or variant thereof as described herein comprises a PEG modification at the N-terminus. Examples of polyethylene glycols include, but are not limited to, monomethoxy PEG maleimide, monomethoxy PEG iodoacetamide, or monomethoxy PEG propionaldehyde. In addition, the polyethylene glycol may have a molecular weight of about 1 Kd to 200 Kd, about 5 Kd to 200 Kd, about 5 Kd to 150 Kd, about 8 Kd to 150 Kd, about 8 Kd to 100 Kd, about 10 Kd to 100 Kd, about 10 Kd to 50 Kd, about 12 Kd to 50 Kd, or about 12 Kd to 40 Kd.

In some specific embodiments, the modified sDSS1 protein or a fragment or variant thereof has a longer half-life compared to the unmodified sDSS1 protein or a fragment or variant thereof. In some specific embodiments, the modified sDSS1 protein or a fragment or variant thereof has a higher stability compared to the unmodified sDSS1 protein or a fragment or variant thereof. In some specific embodiments, the modified sDSS1 protein or a fragment or variant thereof has a stronger biological activity as described herein compared to the unmodified sDSS1 protein or a fragment or variant thereof.

Also provided herein is a host cell expressing the proteins or polypeptides disclosed herein. The host cell comprises a single cell, a cell culture or a cell line. The host cell comprises the progeny of a single host cell. The host cell can be transfected with a heterologous sequence comprising the vectors as described herein. The host cell may be prokaryotic or eukaryotic, such as bacterial cells, fungal cells, animal cells, insect cells, plant cells, etc. Examples of bacterial host cells include microorganisms belonging to *Escherichia, Serratia, Bacillus, Brevibacterium, Corynebacterium, Microbacterium, Pseudomonas*), etc. For example, bacterial host cells can include but are not limited to *Escherichia coli* XL1-Blue, XL2-Blue, DH1, MC1000, KY3276, W1485, JM109, HB101, No. 49, i W3110, NY49, G1698, BL21 or TB1. Other bacterial host cells can include but are not limited to *Serratia ficaria, Serratia fonticola, Serratia liquefaciens, Serratia marcescens, Bacillus subtilis, Bacillus amyloliquefaciens, Brevibacterium ammoniagenes, Brevibacterium immariophilum* ATCC 14068, *Brevibacterium saccharolyticum*) ATCC 14066, *Brevibacterium flavum*) ATCC 14067, *Brevibacterium lactofermentum*) ATCC 13869, *Corynebacterium glutamicum*) ATCC 13032, *Corynebacterium glutamicum*) ATCC 13869, *Corynebacterium acetoacidophilum*) ATCC 13870, *Microbacterium ammoniaphilum*) ATCC 15354; *Pseudomonas putida, Pseudomonas* sp. D-0110, etc.

Yeast host cells can include microorganisms belonging to *Kluyveromyces, Trichosporon, Saccharomyces, Schizosaccharomyces, Schwanniomyces, Pichia, Candida*, etc., for example, microorganisms such as *Saccharomyces cerevisiae, Schizosaccharomyces pombe, Kluyveromyces lactis, Trichosporon pullulans, Schwanniomyces alluvius, Candida utilis*, etc.

Examples of eukaryotic cells include animal cells, such as mammalian cells. For example, the host cells include but are not limited to Chinese hamster ovary cells (CHOs) or monkey cells, such as COS cells, HepG2 cells, A549 cells, and any cells available from ATCC or other Collection Organizations.

The host cells of the present disclosure can be grown in culture and in any equipment (including fermenters) that can be used to grow the culture. They can be grown as a single layer or attached to the surface. Alternatively, the host cell can grow in suspension. Cells can be grown in serum-free medium. The medium can be a commercially available medium, such as but not limited to Opti-CHO (Invitrogen, Catalogue #12681) supplemented with glutamine such as 8 mM L-glutamine.

The host cell of the present disclosure may contain heterologous sequences to achieve the expression of the polypeptides or proteins described herein. The heterologous sequence may comprise a vector, which is a preferably self-replicating nucleic acid molecule, which transfers the inserted nucleic acid molecule into and/or between the host cells. The vectors can include vectors that mainly play the role of inserting DNAs or RNAs into cells, vector replication that mainly plays the role of DNA or RNA replication, and expression vectors that play the role of DNA or RNA transcription and/or translation. It also includes vectors that provide more than one of the above-mentioned effects. The expression vector is a polynucleotide that can be transcribed and translated into a polypeptide when introduced into a suitable host cell.

The heterologous sequence encoding the protein or polypeptide described herein can be expressed by a single or multiple vectors. Nucleic acid sequences can be arranged in any order in a single operon or in separate operons placed in one or more vectors. When needed, two or more expression vectors can be utilized, each of which contains one or more heterologous sequences operatively linked in a single operon. Linked refers to the joining of two or more chemical elements or components by any means including chemical coupling or recombinant means. Operatively linked refers to juxtaposition, where the components such described are in a relationship that allows them to function in their intended manner. For example, if the promoter sequence promotes the transcription of the coding sequence, the promoter sequence is linked or operatively linked to the coding sequence. The vectors described herein can be episomally replicable, or as part of the host cell genome.

The heterologous sequence of the present disclosure can be under the control of a single regulatory element. In some cases, the heterologous nucleic acid sequence is regulated by a single promoter. In other cases, the heterologous nucleic acid sequence is placed within a single operon. In still other cases, the heterologous nucleic acid sequence is placed in a single reading frame.

The preparation of the nucleic acids described herein can be carried out by a variety of conventional recombinant techniques and synthetic procedures. Standard recombinant DNA and molecular cloning techniques are well known in the art, and are described in Sambrook, J., Fritsch, E. F. and Maniatis, T. Molecular Cloning: A Laboratory Manual; Cold Spring Harbor Laboratory Press: Cold Spring Harbor, (1989) (Maniatis) and T. J. Silhavy, M. L. Bennan, and L. W. Enquist, Experiments with Gene Fusions, Cold Spring Harbor Laboratory, Cold Spring Harbor, N.Y. (1984) and Ausubel, F. M. et al., Current Protocols in Molecular Biology, Greene Publishing Assoc. and Wiley-Interscience (1987). In short, the nucleic acids described herein can be prepared as genomic DNA fragments, cDNAs and RNAs, all of which can be directly extracted from cells or produced recombinantly by a variety of amplification methods including but not limited to PCR and rtPCR.

The direct chemical synthesis of nucleic acids usually involves the sequential addition of 3'-blocked and 5'-blocked nucleotide monomers to the terminal 5'-hydroxyl group of the growing nucleotide polymer chain, where each addition is achieved through the nucleophilic attack of the terminal 5'-hydroxyl group of the growing chain to the 3'-position of the monomer to be added, and the added monomer is usually a phosphorus derivative, such as a phosphotriester, phosphoramidite, etc. This method is known to those of ordinary skill in the art and is described in related texts and documents (for example, Matteuci et al., Tet. Lett. 521:719 (1980); U.S. Pat. No. 4,500,707 granted to Caruthers et al.; and U.S. Pat. Nos. 5,436,327 and 5,700,637 granted to Southern et al.).

Regulatory elements include, for example, promoter and operator genes, which can also be engineered to increase the expression of one or more heterologous sequences encoding glycoproteins. A promoter is a nucleotide sequence that initiates and controls the transcription of a nucleic acid sequence by RNA polymerase. An operator gene is a nucleotide sequence adjacent to a promoter that functions to control the transcription of a desired nucleic acid sequence. An operator gene contains a protein binding domain, in which specific repressor proteins can be bound. In the absence of a suitable repressor protein, transcription is initiated by a promoter. In the presence of a suitable repressor protein, the repressor protein binds to the operator gene and thereby inhibits transcription from the promoter.

In some embodiments of the present disclosure, the promoter used in the expression vector is inducible. In some other embodiments, the promoter used in the expression vector is constitutive. In some embodiments, one or more nucleic acid sequences are operatively linked to an inducible promoter, while one or more other nucleic acid sequences are operatively linked to a constitutive promoter. Non-limiting examples of suitable promoters for eukaryotic host cells include, but are not limited to, CMV immediate early promoter, HSV thymidine kinase promoter, early or late SV40 promoter, LTR from retrovirus and mouse metallothionein-I promoter.

Generally, genes in the expression vector will also encode ribosome binding sites to guide the translation (i.e., synthesis) of any encoded mRNA gene product. Other regulatory elements that can be used in the expression vector include a transcription enhancer element and a transcription terminator. See, for example, Bitter et al., Methods in Enzymology, 153:516-544 (1987).

An expression vector can be applicable to a particular type of host cells but not to other host cells. However, those of ordinary skill in the art can easily determine whether a particular expression vector is applicable to a given host cell through routine experiments. For example, the expression vector can be introduced into the host organism, and its viability and the expression of any genes contained in the vector can then be monitored.

The expression vector can also include one or more selectable marker genes, which are expressed to confer one or more phenotypic traits useful for selecting or otherwise identifying the host cells that carry the expression vector. Non-limiting examples of suitable selectable markers for eukaryotic cells include dihydrofolate reductase and neomycin resistance.

The vectors described herein can be stably or temporarily introduced into host cells by a variety of established techniques. For example, one of the methods involves calcium chloride treatment, where the expression vector is introduced by calcium precipitation. Other salts, such as calcium phosphate, can also be used following a similar procedure. In addition, electroporation (i.e. applying an electric current to increase the permeability of a cell to nucleic acids) can be used. Other transformation methods include microinjection, DEAE dextran-mediated transformation and heat shock in the presence of lithium acetate. Lipid complexes, liposomes and dendrimers can also be used to transfect host cells.

After the heterologous sequence is introduced into the host cells, a variety of methods can be implemented to identify the host cells into which the vector described herein has been introduced. An exemplary selection method involves subculturing a single cell to form a single colony, and then detecting the expression of the desired protein product. Another method for the selection of host cells containing heterologous sequences is based on the phenotypic traits conferred by the expression of the selectable marker genes contained in the expression vector. Those of ordinary skill can use these or other methods available in the art to identify genetically modified host cells.

For example, the introduction of various heterologous sequences of the present disclosure into host cells can be confirmed by methods such as PCR, Southern blotting or Northern blotting. For example, the nucleic acid can be prepared from the resulting host cells, and the specific sequence of interest can be amplified by PCR using primers specific to the sequence of interest. The amplified product undergoes agarose gel electrophoresis, polyacrylamide gel electrophoresis or capillary electrophoresis, followed by staining with ethidium bromide, SYBR Green solution, etc., or UV detection to detect DNA. Alternatively, nucleic acid probes specific to the sequence of interest can be used in the hybridization reaction. The expression of a specific gene sequence can be determined by detecting corresponding mRNAs via reverse transcription coupled PCR or Northern blot hybridization, or by immunoassay using an antibody that is reactive to the encoded gene product. Exemplary immunoassays include, but are not limited to, ELISA, radioimmunoassay, and sandwich immunoassay.

In addition, the introduction of various heterologous sequences of the present disclosure into host cells can be confirmed by the enzymatic activity of the enzyme encoded by the heterologous sequences. The enzyme can be determined by a variety of methods known in the art. Generally, the enzymatic activity can be determined by the formation of the product of the enzymatic reaction under study, or the conversion of substrates. This reaction can occur in vitro or in vivo.

In one aspect, provided herein is a method for treating atherosclerosis and/or atherosclerosis-related diseases, comprising administering to the individual a therapeutically effective amount of a sDSS1 protein or a fragment or variant thereof, a nucleic acid encoding the sDSS1 protein or a fragment or variant thereof, or a vector containing the nucleic acid, transplanting to the individual a cell expressing the sDSS1 protein or a fragment or variant thereof, or a tissue or organ containing the sDSS1 protein or a fragment or variant thereof or the nucleic acid, and/or infusing to the individual a serum, cerebrospinal fluid, lymphatic fluid or interstitial fluid containing the sDSS1 protein or a fragment or variant thereof or the nucleic acid.

In another aspect, provided herein is a method for reducing lipid absorption by blood vessel in an individual in need thereof, comprising administering to the individual a therapeutically effective amount of a sDSS1 protein or a fragment or variant thereof, a nucleic acid encoding the sDSS1 protein or a fragment or variant thereof, or a vector containing the nucleic acid, transplanting to the individual a cell expressing the sDSS1 protein or a fragment or variant thereof, or a tissue or organ containing the sDSS1 protein or a fragment or variant thereof or the nucleic acid, and/or infusing to the individual a serum, cerebrospinal fluid, lymphatic fluid or interstitial fluid containing the sDSS1 protein or a fragment or variant thereof or the nucleic acid.

In another aspect, provided herein is a method for reducing accumulation of lipids in macrophages in an individual in need thereof, comprising administering to the individual a therapeutically effective amount of a sDSS1 protein or a fragment or variant thereof, a nucleic acid encoding the sDSS1 protein or a fragment or variant thereof, or a vector containing the nucleic acid, transplanting to the individual a cell expressing the sDSS1 protein or a fragment or variant thereof, or a tissue or organ containing the sDSS1 protein or a fragment or variant thereof or the nucleic acid, and/or infusing the individual a serum, cerebrospinal fluid, lymphatic fluid or interstitial fluid containing the sDSS1 protein or a fragment or variant thereof or the nucleic acid.

In another aspect, provided herein is a method for increasing accumulation of lipids in hepatocytes in an individual in need thereof, comprising administering to the individual a therapeutically effective amount of a sDSS1 protein or a fragment or variant thereof, a nucleic acid encoding the sDSS1 protein or a fragment or variant thereof, or a vector containing the nucleic acid, transplanting to the individual a cell expressing the sDSS1 protein or a fragment or variant thereof, or a tissue or organ containing the sDSS1 protein or a fragment or variant thereof or the nucleic acid, and/or infusing to the individual a serum, cerebrospinal fluid, lymphatic fluid or interstitial fluid containing the sDSS1 protein or a fragment or variant thereof or the nucleic acid.

In another aspect, provided herein is a complex of a sDSS1 protein, or a fragment or variant thereof with a lipid.

In another aspect, provided herein is a method for screening a therapeutic agent for treating atherosclerosis or atherosclerosis-related diseases in an individual in need thereof, comprising contacting the therapeutic agent with a sDSS1 protein, a sDSS1 protein gene, a regulatory element of the sDSS1 gene, and a transcription product of the sDSS1 gene, and evaluating the effect of the therapeutic agent on the expression of the sDSS1 protein.

Epidemiological data, preclinical research and clinical trial data since 1955 show that dyslipidemia characterized by elevated low density lipoprotein cholesterol (LDL-c) is an important risk factor of atherosclerotic cardiovascular disease (ASCVD), and is positively associated with the morbidity and mortality of cardiovascular diseases. LDL and oxidized low density lipoprotein (oxLDL) are significantly increased in patients with ASCVD, and are associated with cardiovascular events [1]. Lowering LDL and oxLDL levels can significantly reduce the incidence and death risk of ASCVD [2-7]. Other types of dyslipidemia such as increased TG or decreased high density lipoprotein (HDL) are also associated with the increased risk of developing ASCVD [8, 9].

LDL forms oxLDL in the endothelial layer of arterial wall under the action of reactive oxygen species (ROS) in vivo. OxLDL can promote the occurrence and development of atherosclerosis by participating in abnormal activation of vascular endothelial cells, phagocytosis of macrophages and formation of foam cells [10-12]. When the vascular endothelial cells are abnormally activated, integrins and adhesion molecules expressed by the surface of the vascular endothelial cells and chemokines secreted by the same are obviously increased. These functional changes make monocytes in the circulatory system more likely to adhere and migrate into the intima of blood vessels and further differentiate into macrophages. The macrophages uptake oxLDL through scavenger receptors on their surfaces. With the lipid accumulation in the macrophages, the macrophages gradually turn into foam cells and undergo apoptosis or necrosis. The macrophages and foam cells can further release more chemokines to recruit more mononuclear macrophages and smooth muscle cells to migrate to intima, eventually atherosclerotic plaques are formed [13]. The progress of atherosclerosis can be prevented or delayed by reducing the uptake of oxLDL by cells, inhibiting the abnormal activation of vascular endothelial cells and the uptake of oxLDL by macrophages [14-16].

Accordingly, in one aspect, the composition, method and/or polypeptide described herein can be used to reduce lipid absorption by vascular endothelial cells or macrophages in an individual in need thereof. Still further, in another aspect, provided herein is a modified cell having reduced absorption of blood lipids or cholesterol after contacting with the composition and/or polypeptide described herein. In some specific embodiments, the cell is a vascular endothelial cell. In some specific embodiments, the cell is a macrophage. In some specific embodiments, the absorption of blood lipids or cholesterol by the modified cell is reduced by at least 5% after contacting with the composition and/or polypeptide described herein. In some specific embodiments, the absorption of blood lipids or cholesterol by the modified cell is reduced by at least 10% after contacting with the composition and/or polypeptide described herein. In some specific embodiments, the absorption of blood lipids or cholesterol by the modified cell is reduced by at least 20% after contacting with the composition and/or polypeptide described herein. In some specific embodiments, the absorption of blood lipids or cholesterol by the modified cell is reduced by at least 30% after contacting with the composition and/or polypeptide described herein. In some specific embodiments, the absorption of blood lipids or cholesterol by the modified cell is reduced by at least 40% after contacting with the composition and/or polypeptide described herein. In some specific embodiments, the absorption of blood lipids or cholesterol by the modified cell is reduced by at least 50% after contacting with the composition and/or polypeptide described herein. In some specific embodiments, the absorption of blood lipids or cholesterol by the modified cell is reduced by at least 100% after contacting with the composition and/or polypeptide described herein.

OxLDL is derived from the oxidative modification of LDL in the arterial vessel wall, the production of which is positively correlated with the oxidative pressure level in the body. OxLDL/LDL ratio can be used as an evaluation index for reflecting the lipid oxidation level of patients [17-19]. OxLDL and LDL can enter hepatocytes through a scavenger receptor class B type I (SR-BI) and a low density lipoprotein receptor (LDLR), respectively, and then be cleared by metabolism [20, 21]. Therefore, reducing the lipid oxidation level in the body and increasing the oxLDL clearance from liver cells can be used as a way for preventing and treating cardiovascular and cerebrovascular diseases caused by hyperlipidemia. The composition and/or polypeptide described herein can reduce the lipid oxidation level in the body. Therefore, in one aspect, provided herein is a method for reducing the lipid oxidation level in the body. In another aspect, the composition and/or polypeptide described herein can reduce the oxLDL/LDL ratio in the individual. In some specific embodiments, the oxLDL/LDL ratio in the individual is reduced by at least 10% after administration of the composition and/or polypeptide described herein, compared to before treatment. In some specific embodiments, the oxLDL/LDL ratio in the individual is reduced by at least 20% after administration of the composition and/or polypeptides described herein. In some specific embodiments, the oxLDL/LDL ratio in the individual is reduced by at least 30% after administration of the composition and/or polypeptide described herein. In some specific embodiments, the oxLDL/LDL ratio in the individual is reduced by at least 40% after administration of the composition and/or polypeptide described herein. In some specific embodiments, the oxLDL/LDL ratio in the individual is reduced by at least 50% after administration of the composition and/or polypeptide described herein. In some specific embodiments, the oxLDL/LDL ratio in the individual is reduced by at least 100% after administration of the composition and/or polypeptide described herein.

In an invention, provided herein is a method for reducing the amount of circulating oxidized LDL in a blood vessel of an individual, comprising administering an effective amount of a sDSS1 protein or a fragment or variant thereof to the individual, wherein the sDSS1 protein or a fragment or variant thereof is capable of forming a complex with free oxidized LDL.

As used herein, the term "free" is relative to the complex formed with the sDSS1 protein or a fragment or variant thereof described herein. For example, taking oxLDL as an example, oxLDL that is not combined with a sDSS1 protein or the fragment or variant thereof described herein to form a complex is referred to herein as a "free" oxLDL. In contrast, oxLDL that is combined with sDSS1 protein or the fragment or variant thereof described herein to form a complex is referred to as a non-free, complexed or combined oxLDL, or as a protein-oxLDL complex.

Without being limited by theory, it is believed that the polypeptide described herein can form a complex with free lipid molecules in blood, thereby blocking the accumulation of the lipid molecules in blood vessel tissue, and thus reducing the risk of plaque formation in blood vessel and the risk of developing atherosclerosis and related diseases. Therefore, in one aspect, provided herein is a method for sequestering circulating free oxidized LDL in a blood vessel in the form of a protein-lipid complex, comprising exposing the oxidized LDL to the protein to form the protein-lipid complex in the blood vessel, wherein the protein is the sDSS1 protein or a fragment or variant thereof described herein. In an aspect, also provided herein is a complex formed by a protein and lipids in blood, wherein the protein is the sDSS1 protein or a fragment or variant thereof described herein.

Therefore, in some embodiments, the composition, method and/or polypeptide described herein can be used to prevent and/or treat atherosclerosis or atherosclerosis-related diseases.

In some embodiments, the atherosclerosis described herein is an arterial vascular dysfunction due to the lipid accumulation in arterial vessel walls that forms lipid stripes or atheromatous plaques. In some embodiments, the atherosclerosis described herein includes decreased arterial vasomotor function, lumen stenosis and even thrombus due to plaque formation in blood vessels, thereby affecting the blood supply of tissues and organs supplied by the artery, resulting in partial or total ischemia of the tissues and organs.

In some embodiments, the atherosclerosis-related diseases described herein include atherosclerosis-related cardiovascular diseases or atherosclerosis-related peripheral vascular diseases. In some embodiments, the atherosclerosis-related diseases include, but are not limited to, stenosis of inner diameter of blood vessels, dilation of outer diameter of blood vessels, decrease of vasoconstriction and expansion, decreased elasticity of blood vessels, increased fragility of blood vessels, calcification or calcinosis in the wall of blood vessels, decreased blood supply of blood vessels caused by thrombosis, hypertension, angina pectoris, myocardial infarction, myocardial ischemia, arrhythmia, cerebral ischemia, ischemic stroke, cerebral atrophy, renal insufficiency, renal artery stenosis, paralytic ileus and/or limb ischemia necrosis.

The terms "lipid" or "cholesterol" are used interchangeably in terms of circulating lipid or cholesterol content in the blood or blood vessels. Cholesterol exists in the blood in the form of one or more of free or esterified cholesterol, such as lipoprotein particles or chylomicron, very low density lipoprotein (VLDL), low density lipoprotein (LDL) and high density lipoprotein (HDL). Therefore, as far as this invention is concerned, the lipid or cholesterol includes one or more of cholesterol, cholesterol ester, triglyceride, chylomicron (CM), low density lipoprotein (LDL), very low density lipoprotein (VLDL), intermediate density lipoprotein (IDL), lipoprotein (a) (Lp(a)), and oxidized low density lipoprotein (oxLDL), and their respective metabolic intermediates. In some specific embodiments, the lipid or cholesterol described herein refers to lipoprotein. In some specific embodiments, the lipid or cholesterol described herein refers to low density lipoprotein (LDL). In some specific embodiments, the lipid or cholesterol as used herein refers to oxidized low density lipoprotein (oxLDL).

The concentration of total cholesterol in the blood is affected by the absorption of cholesterol from digestive tract, the synthesis of cholesterol from dietary components such as carbohydrate, protein, fat and ethanol, and the removal of cholesterol from the blood through tissues, after which cholesterol is converted into bile acid, steroid hormone and bile cholesterol. The liver is an important organ for removing cholesterol from the blood. A method for preventing and/or treating atherosclerosis includes reducing the amount of circulating cholesterol in the blood. The clearance of cholesterol by hepatocytes can reduce the circulating cholesterol content in the blood, thereby reducing the risk of atherosclerosis. Therefore, an effective method for preventing and/or treating atherosclerosis includes improving the absorption or clearance of lipid by hepatocytes. Accordingly, in one aspect, the compositions, methods and/or polypeptides described herein can be used in the method of increasing lipid accumulation in hepatocytes in an individual in need thereof. In some specific embodiments, the compositions, methods and/or polypeptides described herein effectively improve the absorption of blood lipids by hepatocytes, thereby reducing the amount of circulating lipids in the blood. In some specific embodiments, the composition, method and/or polypeptide described herein effectively improve the absorption of circulating oxLDL in the blood by hepatocytes, thereby reducing the amount of circulating oxLDL in the blood.

The concentration of circulating cholesterol in the blood can be influenced by genetic factors and environmental factors. The genetic factors include a concentration of cholesterol biosynthesis rate-limiting enzyme, a concentration of low density lipoprotein receptor in liver, a concentration of rate-limiting enzymes for converting cholesterol bile acids, the speed of lipoprotein synthesis and secretion, and the gender of human. Environmental factors affecting the steady state of blood cholesterol concentration in human body include dietary structure, smoking frequency, physical exercise and the use of various drugs. Dietary variables include an amount and type of fat (saturated and polyunsaturated fatty acids), an amount of cholesterol, an amount and type of fiber, vitamins such as vitamins C and D, and an amount of minerals such as calcium.

The method described herein also comprises administering to the individual lipid-lowering drugs, including statins, fibrates, cholesterol absorption inhibitors, probucol, cholic acid chelating agents, nicotinic acids, and proprotein convertase subtilisin 9 inhibitors, etc. In some specific embodiments, the method described herein further comprises administering a low-cholesterol diet to the individual. In some specific embodiments, the method described herein further comprises administering a high-fiber diet to the individual. In some specific embodiments, the method described herein comprises increasing the amount of weekly exercise of the individual. In some specific embodiments, the method described herein comprises increasing the amount of weekly exercise of the individual by at least 10%. In some specific embodiments, the method described herein comprises increasing the amount of weekly exercise of the individual by at least 20%. In some specific embodiment, the method described herein comprises increasing the amount of weekly exercise of the individual by at least 30%. In some specific embodiments, the method described herein comprises increasing the amount of weekly exercise of the individual by at least 40%. In some specific embodiments, the method described herein comprises increasing the amount of weekly exercise of the individual by at least 50%. In some specific embodiments, the method described herein comprises increasing the amount of weekly exercise of the individual by at least 100%.

In some specific embodiments, the method described herein comprises administering to the individual a therapeutically effective amount of a sDSS1 protein or a fragment or variant thereof. In some specific embodiments, the method described herein comprises administering to the individual an effective amount of a nucleic acid encoding the sDSS1 protein or a fragment or variant thereof or a vector containing the nucleic acid. In some specific embodiments, the method described herein comprises transplanting to the individual a cell expressing the sDSS1 protein or a fragment or variant thereof, or tissues or organs containing the sDSS1 protein or a fragment or variant thereof or the nucleic acid. In some specific embodiments, the method described herein comprises infusing to the individual a serum, cerebrospinal fluid, lymph or interstitial fluid containing the sDSS1 protein or a fragment or variant thereof or the nucleic acid. In some specific embodiments, the method described herein comprises one or more of the above.

In some specific embodiments, the individual is a mammal. In some specific embodiments, the individual is a human. In some specific embodiments, the individual may be a mouse, rat, cat, dog, rabbit, sheep, horse, cow, goat, gerbil, hamster, guinea pig, monkey or any other mammals.

In some specific embodiments, the individual undergoes a surgery. In some specific embodiments, the individual undergoes a surgery including percutaneous coronary intervention, coronary artery bypass grafting, and/or carotid endarterectomy.

The composition described herein comprises active ingredients (including the sDSS1 protein or a fragment or variant thereof, the nucleic acid encoding the sDSS1 protein or a fragment or variant thereof, the vector containing the nucleic acid, the cell, the tissue and/or organ containing the sDSS1 protein or a fragment or variant thereof or the nucleic acid, including serum, cerebrospinal fluid, lymph and/or interstitial fluid, etc.) described herein, and one or more pharmaceutically acceptable excipient and carrier, including but not limited to inert solid diluent and filler, diluent, sterile aqueous solution and various organic solvents, penetration enhancers, solubilizers and adjuvants. The following describes a non-limiting exemplary pharmaceutical composition and preparation thereof.

The composition described herein may be, for example, in a form suitable for oral administration as a tablet, capsule, pill, powder, sustained-release formulation, solution or suspension, for parenteral injection as a sterile solution, suspension or emulsion, for topical administration as an ointment or cream, or for rectal administration as a suppository. The pharmaceutical composition may be a unit dosage form suitable for single administration of a precise dose.

Exemplary parenteral dosage form includes solution or suspension of the active ingredient described herein in a sterile aqueous solution such as propylene glycol aqueous solution or dextrose solution. If necessary, such dosage form can be appropriately buffered with salt such as histidine and/or phosphate.

In some cases, provided herein is a pharmaceutical composition for injection, which contains the active ingredient described herein and the pharmaceutical excipient suitable for injection. The ingredient and dosage of the composition are as described herein.

Dosage forms that can be incorporated into the novel composition of the present invention for injection administration include aqueous or oily suspensions or emulsions, which comprise sesame oil, corn oil, cottonseed oil or peanut oil, as well as elixirs, mannitol, dextrose or sterile aqueous solutions and similar pharmaceutical carriers.

Aqueous solution in saline is also routinely used for injection. Ethanol, glycerol, propylene glycol, liquid polyethylene glycol, etc. (and suitable mixtures thereof), cyclodextrin derivative and vegetable oil can also be used. Appropriate fluidity can be maintained as follows: for example, by using a coating such as lecithin to maintain a desired particle size in the case of dispersion, and by using a surfactant. Various antibacterial and antifungal agents such as phydroxybenzoate, chlorobutanol, phenol, sorbic acid, thimerosal, etc. can be used to prevent the action of microorganisms.

A sterile injection solution can be prepared by the following steps: incorporating an active ingredient described herein of the present invention in a desired amount into an appropriate solvent having various other ingredients listed above as required, and then filtering and sterilizing. Generally, dispersion is prepared by incorporating various sterilized active ingredients into a sterile carrier containing a basic dispersion medium and other desired ingredients from those listed above. In the case of sterile powder for preparation of sterile injectable solution, some of the desired preparation methods are vacuum drying technique and freeze drying technique, which produce powders of active ingredients plus any additional desired ingredients from their previously sterile-filtered solution.

In some cases, provided herein is a pharmaceutical composition for oral administration, which contains the active ingredient described herein and pharmaceutical excipients suitable for oral administration.

In some cases, provided herein is a solid pharmaceutical composition for oral administration, comprising: (i) an effective amount of an active ingredient as described herein; optionally (ii) an effective amount of a second agent; and (iii) pharmaceutical excipients suitable for oral administration. In some embodiments, the composition further comprises: (iv) an effective amount of a third agent.

In some cases, the pharmaceutical composition may be a liquid pharmaceutical composition suitable for oral administration. The composition described herein suitable for oral administration can be presented in discrete dosage forms such as capsules, cachets or tablets, or liquid or aerosol sprays each containing a predetermined amount of active ingredients, as powders or granules, solutions, or suspensions in an aqueous or non-aqueous liquid, oil-in-water emulsions, or water-in-oil liquid emulsion. Such dosage forms can be prepared by any pharmaceutical method, provided that it includes the step of combining the active ingredient with the carriers that constitute one or more essential ingredients. Generally, the composition is prepared by uniformly and compactly mixing the active ingredient with a liquid carrier or a finely-divided solid carrier or both, and then, if necessary, shaping the product into a desired presentation form.

The present invention further includes anhydrous pharmaceutical compositions and dosage forms containing an active ingredient, since water can promote the degradation of some polypeptides. For example, in the pharmaceutical field, water (e.g. 5%) can be added as a means of simulating long-term storage to determine characteristics such as shelf-life or stability over time of a formulation. The anhydrous pharmaceutical compositions and dosage forms of the present invention may be prepared by using anhydrous or low-moisture ingredients and a low-moisture or low-humidity condition. The compositions and dosage forms described herein containing lactose can be made anhydrous if substantial contact with water and/or moist air is expected during manufacture, packaging and/or storage. The anhydrous pharmaceutical composition may be prepared and stored such that its anhydrous property can be maintained. Therefore, the anhydrous composition can be packaged using materials known to prevent exposure to water, so that it can be contained in a suitable formulary kit. Examples of suitable packages include, but are not limited to, hermetically sealed foils, plastics or the like, unit dose containers, blister packages, and strip packages.

The active ingredients described herein can be compactly mixed with pharmaceutical carriers according to conventional pharmaceutical compounding techniques. The carrier can take various forms according to the form of formulation desired for administration. In the preparation of a composition in an oral dosage form, any of the usual pharmaceutical media may be used as a carrier, such as water, glycol, oil, alcohol, flavoring agent, preservative, coloring agent and the like in the case of an oral liquid formulation (such as a suspension, solution and elixir) or an aerosol; or a carrier such as starch, sugar, microcrystalline cellulose, diluent, granulating agent, lubricant, binder and disintegrating agents may be used in the case of an oral solid formulation. In some embodiments, lactose is not used. For example, in a solid oral formulation, a suitable carrier includes powders, capsules and tablets. If needed, the tablet may be coated by standard aqueous or non-aqueous techniques.

Adhesives suitable for pharmaceutical compositions and dosage forms include, but are not limited to, corn starch, potato starch or other starches, gelatin, natural and synthetic gums such as acacia, sodium alginate, alginic acid, other alginates, powdered tragacanth, guar gum, cellulose and derivatives thereof (e.g., ethyl cellulose, cellulose acetate, calcium carboxymethylcellulose, sodium carboxymethylcellulose), polyvinylpyrrolidone, methylcellulose, pregelatinized starch, hydroxypropyl methylcellulose, microcrystalline cellulose, and mixtures thereof.

Examples of suitable fillers for use in the pharmaceutical compositions and dosage forms disclosed herein include, but are not limited to, talc, calcium carbonate (e.g., granule or powder), microcrystalline cellulose, powdered cellulose, glucose binder, kaolin, mannitol, silicic acid, sorbitol, starch, pregelatinized starch and mixtures thereof.

Disintegrants may be used in the compositions of the present invention to provide tablets that disintegrate when exposed to an aqueous environment. Excessive disintegrants may produce tablets that are disintegrated immediately in the bottle. Too little disintegrants may not be enough disintegration to occur and thus may change the release rate and degree of the active ingredients from the dosage form. Therefore, the dosage form of the compounds disclosed herein can be formed using a sufficient amount of disintegrants that is neither too little nor too much so as not to deleteriously change the release of the active ingredients. The amount of disintegrant used may vary depending on the type of formulation and the mode of administration, and can be easily identified by those of ordinary skill in the art. About 0.5 to about 15 wt % of disintegrant or about 1 to about 5 wt % of disintegrant can be used in the pharmaceutical composition. Disintegrants that may be used to form the compositions and dosage forms described herein include, but are not limited to, agar, alginic acid, calcium carbonate, microcrystalline cellulose, croscarmellose sodium, crospovidone, polacrilin potassium, sodium starch glycolate, potato or tapioca starch, other starchs, pregelatinized starch, other starchs, clay, other algins, other celluloses, gum or mixtures thereof.

Lubricants that may be used to form the compositions and dosage forms described herein include, but are not limited to, calcium stearate, magnesium stearate, mineral oil, light mineral oil, glycerin, sorbitol, mannitol, polyethylene glycol, other glycols, stearic acid, sodium lauryl sulfate, talc, hydrogenated vegetable oil (e.g., peanut oil, cottonseed oil, sunflower oil, sesame oil, olive oil, corn oil, and soybean oil), zinc stearate, ethyl oleate, ethyl laurate, agar, or mixtures thereof. Other lubricants include, for example, syloid silica gel, coagulated aerosol of synthetic silica, or mixtures thereof. The lubricants may optionally be added in an amount of less than about 1% by weight of the pharmaceutical composition.

When aqueous suspensions and/or elixirs are required for oral administration, the active ingredients therein may be combined with various sweeteners or flavoring agents, coloring substances or dyes, and (if necessary) emulsifiers and/or suspending agents, together with diluents such as water, ethanol, propylene glycol, glycerol and various combinations thereof.

Tablets may be uncoated, or coated by known techniques to delay disintegration and absorption in the gastrointestinal tract, thereby providing sustained action for a longer period of time. For example, a time-delaying material such as glycerol monostearate or glycerol distearate may be used. Formulations for oral administration may also be presented as hard gelatin capsules in which the active ingredients are mixed with inert solid diluents such as calcium carbonate, calcium phosphate or kaolin, or as soft gelatin capsules in which the active ingredients are mixed with water or oil media such as peanut oil, liquid paraffin or olive oil.

Surfactants that may be used to form the compositions and dosage forms described herein include, but are not limited to, hydrophilic surfactants, lipophilic surfactants, and mixtures thereof. That is, a mixture of hydrophilic surfactants, a mixture of lipophilic surfactants, or a mixture of at least one hydrophilic surfactant and at least one lipophilic surfactant may be used.

Surfactants having a low HLB value are more lipophilic or hydrophobic and have high solubility in oil, and surfactants having a high HLB value are more hydrophilic and have higher solubility in aqueous solution. Hydrophilic surfactants are typically considered as those compounds having an HLB value of more than about 10, and anionic, cationic or zwitterionic compounds for which the HLB scale is generally inapplicable to. Similarly, lipophilic (namely hydrophobic) surfactants are compounds having an HLB value of equal to or less than about 10. However, the HLB value of the surfactant is only a rough guidance, which is usually used for supporting the formulation of industrial, pharmaceutical and cosmetic emulsions.

The hydrophilic surfactants can be ionic or non-ionic. Suitable ionic surfactants include but are not limited to alkyl ammonium salts; fusidic acid salts; fatty acid derivatives of amino acids, oligopeptides and polypeptides; glyceride derivatives of amino acids, oligopeptides and polypeptides; lecithin and hydrogenated lecithin; hemolytic lecithin and hydrogenated hemolytic lecithin; phospholipid and derivatives thereof, lysophosphatide and derivatives thereof; carnitine fatty acid ester salts; salts of alkyl sulfate; fatty acid salts; sodium docusate; acyl lactate; monoacetylated tartarates and diacetylated tartarates of monoglycerides and diglycerides; succinylated monoglycerides and diglycerides; citrates of monoglycerides and diglycerides; and the mixtures thereof.

In the above group, the ionic surfactants include, for example, lecithin, lysophosphatidylcholine, phospholipid, lysophosphatide and derivatives thereof; carnitine fatty acid ester salts; salts of alkyl sulfate; fatty acid salts; sodium docusate; acyl lactate; monoacetylated tartrate sand diacetylated tartrates of monoglycerides and diglycerides; succinylated monoglycerides and diglycerides; citrates of monoglyceride and diglyceride; and the mixtures thereof.

The ionic surfactants can be lecithin, lysophosphatidylcholine, phosphatidyl choline, phosphatidylethanolamine, phosphatidylglycerol, phosphatidic acid, phosphatidylserine, lysophosphatidylcholine, lysophosphatidyl ethanolamine, lysophosphatidylglycerol, lysophosphatidic acid, lysophosphatidylserine, PEG-phosphatidylethanolamine, PVP-phosphatidylethanolamine, lactoyl ester of fatty acid, stearoyl-2-lactate, stearoyl lactate, succinylated monoglyceride, mono/diacetylated tartarate of mono/diglycerides, citrate of mono/diglycerides, cholelysarcosine, hexanoate, octanoate, decanoate, laurate, myristate, palmitate, oleate, ricinoleate, linoleate, linolenate, stearate, lauryl sulfate, teracetyl sulfate, docusate, lauroyl carnitine, palmitoyl carnitine, myristoyl carnitine, and ionized forms of salts and the mixtures thereof.

Hydrophilic non-ionic surfactants can include but are not limited to alkyl glucoside; alkyl maltoside; alkyl thioglucoside; lauryl polyethylene glycol glyceride; polyoxyalkylene alkyl ether, such as polyethylene glycol alkyl ether; polyoxyalkylene alkyl phenol, such as polyethylene glycol alkyl phenol; polyoxyalkylene alkyl phenol fatty acid ester, such as polyethylene glycol fatty acid monoester and polyethylene glycol fatty acid diester; polyethylene glycol glycerin fatty acid ester; polyglycerol fatty acid ester; polyoxyethylene dehydrated sorbitol fatty acid ester, such as polyethylene glycol dehydrated sorbitol fatty acid ester; hydrophilic ester exchange products of polyols with at least one member of a group consisting of glycerides, vegetable oils, hydrogenated vegetable oils, fatty acids and sterols; polyoxyethylene sterols and derivatives and analogues thereof; polyoxyethylene vitamins and derivatives thereof; polyoxyethylene-polyoxypropylene block copolymers; and the mixtures thereof; polyethylene glycol dehydrated sorbitol fatty acid esters and hydrophilic ester exchange products of polyols with at least one member of a group consisting of triglycerides, vegetable oils and hydrogenated vegetable oils. The polyol can be glycerol, ethylene glycol, polyethylene glycol, sorbitol, propylene glycol, pentaerythritol or saccharides.

Other hydrophilic non-ionic surfactants include but are not limited to PEG-10 laurate, PEG-12 laurate, PEG-20 laurate, PEG-32 laurate, PEG-32 dilaurate, PEG-12 oleate, PEG-15 oleate, PEG-20 oleate, PEG-20 dioleate, PEG-32 oleate, PEG-200 oleate, PEG-400 oleate, PEG-15 stearate, PEG-32 distearate, PEG-40 stearate, PEG-100 stearate, PEG-20 dilaurate, PEG-25 glyceryl trioleate, PEG-32 dioleate, PEG-20 glyceryl laurate, PEG-30 glyceryl laurate, PEG-20 glyceryl stearate, PEG-20 glyceryl oleate, PEG-30 glyceryl oleate, PEG-30 glyceryl laurate, PEG-40 glyceryl laurate, PEG-40 palm kernel oil, PEG-50 hydrogenated castor oil, PEG-40 castor oil, PEG-35 castor oil, PEG-60 castor oil, PEG-40 hydrogenated castor oil, PEG-60 hydrogenated castor oil, PEG-60 corn oil, PEG-6 glyceryl decanoate/octanoate, PEG-8 glyceryl decanoate/octanoate, polyglyceryl-10 laurate, PEG-30 cholesterol, PEG-25 phytosterol, PEG-30 soybean sterol, PEG-20 trioleate, PEG-40 dehydrated sorbitan oleate, PEG-80 dehydrated sorbitan laurate, polysorbate 20, polysorbate 80, POE-9 dodecyl ether, POE-23 dodecyl ether, POE-10 oleyl ether, POE-20 oleyl ether, POE-20 stearyl ether, tocopherol PEG-100 succinate, PEG-24 cholesterol, polyglyceryl-10 oleate, Tween 40, Tween 60, sucrose monostearate, sucrose monolaurate, sucrose monopalmitate, PEG10-100 nonylphenol series, PEG15-100 octylphenol series and poloxamers.

Suitable lipophilic surfactants include, for example, fatty alcohol; glycerin fatty acid esters; acetylated glycerin fatty acid esters; lower alcohol fatty acid esters; propylene glycol fatty acid esters; sorbitan fatty acid esters; polyethylene glycol sorbitan fatty acid esters; sterols and sterol derivatives; polyoxyethylenated sterols and sterol derivatives; polyethyleneglycol alkyl ether; sugar ester; sugar ether; lactic acid derivatives of monoglyceride and diglyceride; hydrophobic ester exchange products of polyols with at least one member of the group consisting of glycerides, vegetable oils, hydrogenated vegetable oils, fatty acids and sterols;

oil-soluble vitamins/vitamin derivatives; and the mixtures thereof. In this group, preferred lipophilic surfactants include glycerin fatty acid esters, propylene glycol fatty acid esters and the mixtures thereof, or hydrophobic transesterification products of polyols with at least one member of a group consisting of vegetable oils, hydrogenated vegetable oils and triglycerides.

In one embodiment, the composition can comprise a solubilizer to ensure good solution and/or dissolution of the compound of the disclosure and minimize the precipitation of the compound of the disclosure. This may be especially important for non-oral compositions (for example compositions for injection). The solubilizer can also be added to increase the solubility of hydrophilic drugs and/or other components such as surfactants, or maintain the composition to be as a stable or homogeneous solution or dispersion.

Examples of suitable solubilizers include but are not limited to the following substances: alcohols and polyols, such as ethanol, isopropanol, butanol, benzyl alcohol, ethylene glycol, propylene glycol, butanediol and the isomers thereof, glycerol, pentaerythritol, sorbitol, mannitol, transcutol, dimethyl isosorbitol, polyethylene glycol, polypropylene glycol, polyvinyl alcohol, hydroxypropyl methylcellulose and other cellulose derivatives, cyclodextrin and cyclodextrin derivatives; ethers of polyethylene glycol with an average molecular weight of about 200 to about 6000, such as tetrahydrofurfuryl alcohol PEG ethers (glycofurol) or methoxyl PEG ethers; amides and other nitrogen-containing compounds, such as 2-pyrrolidone, 2-piperidone, ε-caprolactam, N-alkyl pyrrolidone, N-hydroxyalkyl pyrrolidone, N-alkyl piperidone, N-alkyl caprolactam, dimetylacetamide and polyvinylpyrrolidone; esters, such as ethyl propionate, tributyl citrate, triethyl acetylcitrate, tributyl acetylcitrate, triethyl citrate, ethyl oleate, ethyl octanoate, ethyl butyrate, triacetin, propylene glycol monoacetate, propylene glycol diacetate, ε-caprolactone and isomers thereof, δ-valerolactone and isomers thereof, β-butyrolactone and isomers thereof; and other solubilizers known in the art, such as dimethylacetamide, dimethyl isosorbitol, N-methyl pyrrolidone, monoocatanoin, diethylene glycol monoethyl ether and water.

Mixtures of solubilizers can also be used. Examples include but are not limited to triacetin, triethyl citrate, ethyl oleate, ethyl octanoate, dimethylacetamide, N-methyl pyrrolidone, N-hydroxyethyl pyrrolidone, polyvinylpyrrolidone, hydroxypropyl methylcellulose, hydroxypropyl cyclodextrin, ethanol, polyethylene glycol 200-100, glycofurol, transcutol, propylene glycol and dimethyl isosorbitol. Particularly preferred solubilizers include sorbitol, glycerol, triacetin, ethanol, PEG-400, glycofurol and propylene glycol.

The amount of solubilizer that can be contained is not specially limited. The given amount of the solubilizer can be limited as biologically acceptable amount, which can be easily determined by those skilled in the art. In some cases, it is possibly advantageous to include an amount of solubilizer which far exceeds the biologically acceptable amount, for example, to maximize the concentration of a drug, and the excessive solubilizer is removed by using conventional technologies such as distillation or evaporation before the composition is provided to the subject. Thus, if present, the solubilizer can be 10%, 25%, 50%, 100% or up to about 200% (by weight) based on the combined weight of the drug and other excipients. If needed, a very small amount of solubilizer can also be used, for example 5%, 2%, 1% or even less. Generally, the solubilizer can exist in an amount of about 1%~about 100%, more typically about 5%~about 25% (by weight).

The composition can further comprise one or more pharmaceutically acceptable additives and excipients. Such the additives and excipients include but are not limited to antisticking agents, defoamers, buffers, polymers, antioxidants, preservatives, chelating agents, viscomodulators, tonicifiers, flavoring agents, colorants, flavoring agents, sunscreens, suspending agents, adhesives, fillers, plasticizers, lubricants and the mixtures thereof.

In addition, for the sake of convenient treatment and enhancement of stability or other reasons, acids or bases can be admixed into the composition. Examples of pharmaceutically acceptable bases include amino acids, amino acid esters, ammonium hydroxide, potassium hydroxide, sodium hydroxide, sodium bicarbonate, aluminum hydroxide, calcium carbonate, magnesium hydroxide, magnesium aluminum silicate, synthetic aluminum silicate, synthetic hydrocalcite, magnesium aluminum hydroxide, diisopropylethylamine, ethanolamine, ethylenediamine, triethanolamine, triethylamine, triisopropanolamine, trimethylamine, tris (hydroxymethyl) amino methane (TRIS) and the like. Also suitable are bases that are salts of pharmaceutically acceptable acids such as acetic acid, acrylic acid, adipic acid, alginic acid, alkane sulfonic acid, amino acid, ascorbic acid, benzoic acid, boric acid, butyric acid, carbonic acid, citric acid, fatty acid, formic acid, fumaric acid, gluconic acid, hydroquinone sulfonic acid, isoascorbic acid, lactic acid, maleic acid, oxalic acid, p-bromobenzenesulfonic acid, propionic acid, p-toluenesulfonic acid, salicylic acid, stearic acid, succinic acid, tannic acid, tartaric acid, mercaptoacetic acid, toluenesulfonic acid, uric acid, etc. Salts of polybasic acids, such as sodium phosphate, disodium hydrogen phosphate and sodium dihydrogen phosphate, can also be used. When the bases are salts, cations can be any suitable and pharmaceutically acceptable cations, for example ammonium, alkali metal, alkaline earth metal, etc. Examples can include but are not limited to sodium, potassium, lithium, magnesium, calcium and ammonium.

Suitable acids are pharmaceutically acceptable organic or inorganic acids. Examples of suitable inorganic acids include hydrochloric acid, hydrobromic acid, hydroiodic acid, sulfuric acid, nitric acid, boric acid, phosphoric acid and the like. Examples of suitable organic acids include acetic acid, acrylic acid, adipic acid, alginic acid, alkane sulfonic acid, amino acid, ascorbic acid, benzoic acid, boric acid, butyric acid, carbonic acid, citric acid, fatty acid, formic acid, fumaric acid, gluconic acid, hydroquinone sulfonic acid, isoascorbic acid, lactic acid, maleic acid, methanesulfonic acid, oxalic acid, p-bromobenzenesulfonic acid, propionic acid, p-toluenesulfonic acid, salicylic acid, stearic acid, succinic acid, tannic acid, tartaric acid, mercaptoacetic acid, toluenesulfonic acid, uric acid and the like.

In some specific embodiments, the composition and/or protein of the disclosure can be administered in combination with another active substance. The term "administration in combination" refers to administration with one or more dosages and one or more time intervals so that all the administrated programs exist within the individual body or acting site of the individual body at a minimum (de minimus) amount in a certain time interval. For example, the time interval can be any suitable time interval, such as proper time intervals of minutes, hours, days or weeks. For example, the administrated programs can be administrated together, as a part of a single composition for example, or administrated additionally. The administrated programs can be administrated basically at the same time, for example, the time interval between each other is less than or equal to about 5 min, about 3 min or about 1 min, or within the short time of each other's time intervals, for example each other's time interval is less than or equal to about 1 h, 30 min or 10 min, or exceeds about 5 min to at most about 1 h. Such the administrated programs can be considered as being administrated at the basically same time. Those skilled in the art can determine suitable dosage and time interval which are required for the administrated programs to be administrated to the individual body, so that the administrated programs exist in the individual body in a level greater than a minimum level and/or at an effective concentration. When the administrated programs are simultaneously administrated to the individual's body, any such administrated programs can be at an effective amount that is less than an effective amount possibly used when administrated alone. The term "effective amount" further described herein includes this lower effective amount and general effective amount, and in fact is any effective amount that can cause special state, effect and/or response. Therefore, any such dosages for simultaneously administrating programs can be less than dosages possibly used when administrated alone. One or more effects of such any administrated programs may be overlapped or synergetic. Such any administrated programs can be administrated more than once.

In some specific embodiments, the composition and/or protein described herein is administered in combination with another active substance. In some specific embodiments, the active substance is a hypolipidemic drug. In some specific embodiments, the active substance is a hypotensor drug. In some specific embodiments, the active substance is a coagulant.

The term "effective amount" about an activator refers to an amount of the activator sufficient to cause special biological state, effect and/or response. For example, the effective absolute amount of a special agent varies in this manner depending on various factors, such as demanded biological endpoint, agent self, subject or other objective parts and/or similar factors. The effective amount of the activator can be administrated in a single dosage or more dosages. Examples of the biological state, effect and/or response generated by the effective amount of the activator include, for example, reduction in risks and/or severity of atherosclerosis and associated diseases thereof, improvement in absorption of lipids such as lipoprotein by liver tissues or liver cells, reduction in absorption of lipid such as lipoprotein by blood vessels such as vascular endothelial cells or macrophages, reduction in content of circular free lipids, reduction in a proportion of circular free low density lipoprotein such as oxLDL, etc. The components can be described herein as having at least effective amounts or at least effective amounts associated with special objectives or purposes, such as any objectives or purposes as described herein.

EXAMPLES

The following contents will illustrate and verify the preferred embodiments of the disclosure in combination with examples, and are not meant to limit the scope of the disclosure. All the scopes of the disclosure are based on the definition of claims.

Experimental methods used in the following examples, unless otherwise specified, are all conventional experimental methods.

The sDSS1 protein used in the following examples is produced and quality controlled by the company itself. Upon detection, the purity of the protein is more than 95%, and endotoxins (the content of endotoxins is less than 3 EU/mg protein) and other impurity residues meet the standards. The sDSS1 protein can be used for animal experiments without causing obvious animal toxic reaction.

Materials and reagents used in the following examples, expect the sDSS1 protein, are all commercially available.

Example 1: sDSS1 Protein can Interact with oxLDL or LDL 1.1 Experimental Materials and Methods Experimental materials: sDSS1 protein, sDSS1 mutant protein 1 (sDSS1-M1, SEQ ID NO: 15), sDSS1 mutant protein 2 (sDSS1-M2, SEQ ID NO: 16), oxidized low density lipoprotein (oxLDL) (Solarbio, Article No.: H7980); low density lipoprotein (LDL) (Solarbio, Article No.: H7960).

Experimental method: 2 µg of oxLDL or LDL was mixed with 6 µg of sDSS1 protein or 10 µg of sDSS1 protein in a 1.5 ml EP tube in the presence of 20 mM sodium acetate/acetic acid buffer (pH 4.5) or 20 mM phosphate buffer (pH 7.2) respectively, and incubated at 37° C. for 12 h. A loading buffer was added in the incubated product and evenly mixed, and the obtained mixture was denatured at 100° C. for 10 min to prepare a loading sample. The resulting sample was subjected to electrophoretic separation via polyacrylamide gel electrophoresis (SDS-PAGE). After separation, the SDS-PAGE gel was stained with Coomassie brilliant blue to display protein strips. The sDSS1-M1 or sDSS1-M2 protein was respectively mixed and incubated with oxLDL, and treated in the same way. 15 µL of the sample was used for SDS-PAGE electrophoresis separation.

1.2 Experimental Results

In the acetate buffer system (pH 4.5), it was found from the stained SDS-PAGE gels that the LDL protein and the oxLDL protein were located at about 70 kD (L1, L2), and the sDSS1 protein was located at about 15 kD (L3, L6). After the LDL or oxLDL was mixed and incubated with the sDSS1, LDL or oxLDL interacted with the sDSS1 protein (L4 and L7 corresponded to LDL with sDSS1 protein, L5 and L8 corresponded to oxLDL with sDSS1 protein). On the SDS-PAGE gels, the strips of the oxLDL protein or LDL protein in the reaction system become lighter after reaction with the sDSS1 protein; with the increase of the concentration of the sDSS1 protein in the reaction system, there were more complexes formed by LDL or oxLDL with the sDSS1 protein, and the dispersed strips were darker (L4 vs. L7; L5 vs. L8) (FIG. 1A).

In the phosphate buffer system (pH7.2), it was found from the stained SDS-PAGE gels that the LDL protein and the oxLDL protein were located at about 70 kD (L1, L2), and the sDSS1 protein was located at about 15 kD (L3, L6). After the LDL or oxLDL was mixed and incubated with the sDSS1, LDL or oxLDL interacted with the sDSS1 protein (L4 and L7 corresponded to LDL with sDSS1 protein, L5 and L8 corresponded to oxLDL with sDSS1 protein). On the SDS-PAGE gels, the strips of the oxLDL protein or LDL protein in the reaction system become significantly lighter after reaction with the sDSS1 protein; with the increase of the concentration of the sDSS1 protein in the reaction system, there were more complexes formed by LDL or oxLDL with the sDSS1 protein, and the dispersed strips were darker (L4 vs. L7; L5 vs. L8) (FIG. 1B).

These results show that the sDSS1 protein can interact with oxLDL or LDL to form a complex which cannot be separated by SDS-PAGE.

Meanwhile, when the mutant of the sDSS1 protein, namely the sDSS1-M1 protein or sDSS-M2 protein, was incubated with oxLDL, it was also seen that a complex formed by the mutant protein with oxLDL exhibited dispersed strips at a high molecular weight area, the dispersed strips become darker with the increase of the content of the mutant protein, and the strips of the mutant protein become significantly lighter (FIG. 1C, FIG. 1D). These results show that the sDSS1-M1 and sDSS1-M2 proteins can also interact with oxLDL to form complexes which cannot be separated by SDS-PAGE.

Example 2: sDSS1 Protein can Reduce the Uptake of oxLDL by Vascular Endothelial Cells 2.1 Experimental Materials and Methods Experimental materials: sDSS1 protein, DiL-oxLDL (Thermo Fisher technology, Article No.: L34358), human umbilical vein endothelial cell (HUVEC) (PromoCell, Article No.: C-12200).

Experimental method: HUVEC cells were inoculated into a 6-well plate with 300000 cells per well. After 24 h of adherence, 1.5 ml 10 µg/ml DiL-oxLDL was added, or 1.5 ml 10 µg/ml DiL-oxLDL was added together with 2 µg/ml, 5 µg/ml, 10 µg/ml or 20 µg/ml of the sDSS1 protein. After incubation for 5 h in an incubator, the fluorescence signal in the cells was observed by a fluorescence microscope. The cells were digested with trypsin to form single cells for detecting the fluorescence intensity via flow cytometry.

2.2 Experimental Results

Figures 2A, 2D:
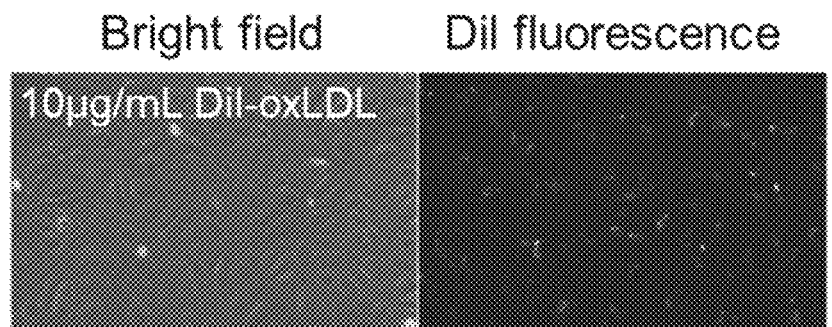
Figures 2B, 2E:
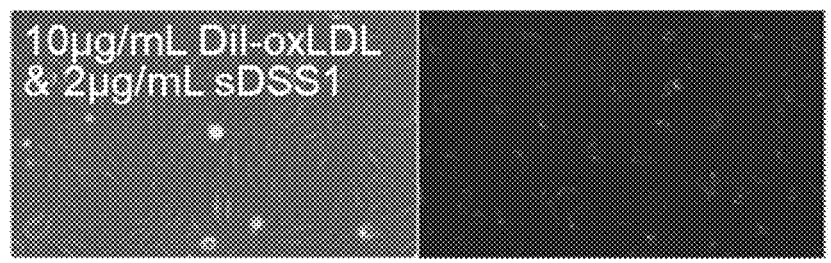
Figures 2C, 2F:
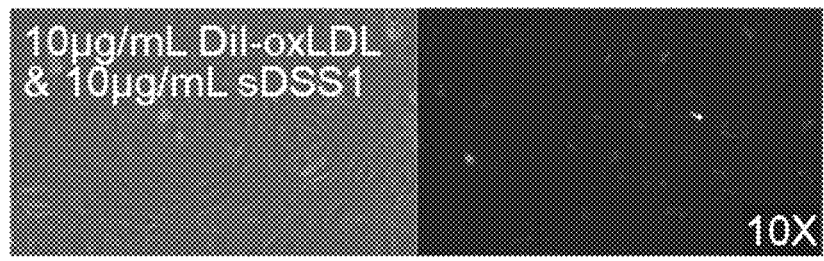

When the DiL-oxLDL was added to the HUVEC cell culture solution and incubated for 5 h, obvious fluorescence was observed in the HUVEC cells under a fluorescence microscope, and phagocytic vesicles occurred in a fluorescent matrix. Moreover, after the sDSS1s protein was added, reduction in the fluorescence intensity in the cells and decrease in the number of phagocytic vesicles having fluorescence in the cells were observed. This phenomenon is dose-dependent. In the high concentration group, the fluorescence in the cells was weak (FIGS. 2A and 2D). The fluorescence intensity of cells was detected by flow cytometry, showing that when 2 µg/ml (FIGS. 2B and 2E) or 10 µg/ml (FIGS. 2C and 2F) of the sDSS1 protein was added, the fluorescence within HUVEC cells was significantly weakened (FIGS. 3A-3C). The statistic results also show that the sDSS1 protein can significantly reduce the fluorescence value in HUVEC cells, and this effect is dose-dependent, suggesting that the sDSS1 protein decreases the uptake of oxLDL in that cells. After 2 µg/ml of the sDSS1 protein was added to the culture solution, the uptake of oxLDL by cells was reduced by half. These results show that the sDSS1 protein can reduce the uptake of oxLDL protein by HUVEC cells (FIG. 4).

Example 3: sDSS1 Protein Inhibits Phagocytosis of oxLDL by Macrophages 3.1 Experimental Materials and Methods Experimental materials: sDSS1 protein, DiL-oxLDL, phorbol ester (PMA, Sigma Aldrich, Article No.: P1585), human monocyte THP-1 (Cell Bank of Typical Culture Preservation Committee of Chinese Academy of Sciences, Catalog No.: SCSP-567).

Experimental method: THP-1 cells were inoculated into a 6-well plate with 250000 cells per well, and the culture solution contained 100 ng/mL PMA. After being activated by PMA for 48 h, the cells were cultured in a fresh culture medium for 4 days to facilitate cell adhesion. The old culture medium was discarded. 1.5 ml 10 µg/ml DiL-oxLDL was added, or 1.5 ml 10 µg/ml DiL-oxLDL was added together with 2 µg/ml, 5 µg/ml, 10 µg/ml, or 20 µg/ml of the sDSS1 protein. After incubation for 5 h in an incubator, the fluorescence signal in the cells was observed by a fluorescence microscope. The cells were digested by trypsin to form single cells for detecting fluorescence intensity via flow cytometry.

3.2 Experimental Results

After DiL-oxLDL was added to macrophages for 5 h, the fluorescence in the cells was detected. The results in the control group show that obvious fluorescence can be observed in macrophages, which appears in a variety of phagocytic vesicles, indicating the uptake of oxLDL by macrophages. However, after sDSS1 protein was added into the culture solution, no obvious fluorescence was observed in the cells, or the fluorescence was very weak (FIGS. 5A-5F). The fluorescence value in the cells was detected by flow cytometry. As can be seen, cells having fluorescence were detected in the control group, and cells having fluorescence were not detected after 2 µg/ml or 10 µg/ml of the sDSS1 protein was added (FIGS. 6A-6C). These results suggest that the sDSS1 protein can inhibit the uptake of oxLDL protein by macrophages.

Example 4: sDSS1 Protein Promotes the Phagocytosis of oxLDL by Hepatocytes, but does not Affect the Phagocytosis of LDL 4.1 Experimental Materials and Methods Materials: sDSS1 protein, DiL-oxLDL, DiL-LDL (ThermoFisher, L3482), human hepatoma cell Hep G2 (Cell Bank of Typical Culture Preservation Committee of Chinese Academy of Sciences, Catalog Number: SCSP-510).

Experimental method: ① When detecting the phagocytosis of oxLDL by Hep G2 cells, Hep G2 cells were inoculated into a 6-well plate with 250000 cells per well. After 12 h, all the cells were adhered. The old culture medium was discarded. 1.5 ml 10 µg/ml DiL-oxLDL was added, or 1.5 ml 10 µg/ml DiL-oxLDL was added together with 5 µg/ml and 50 µg/ml of the sDSS1 protein. After incubation for 9 h in the incubator, the fluorescence signal in the cells was observed by a fluorescence microscope. The cells were digested by trypsin to form single cells for detecting fluorescence intensity via flow cytometry. ② When detecting the phagocytosis of LDL by Hep G2 cells, Hep G2 cells were inoculated into a 6-well plate with 250000 cells per well. After 12 h, all the cells were adhered. The old culture medium was discarded. 1.5 ml 10 µg/ml DiL-LDL was added, or 1.5 ml 10 µg/ml DiL-LDL was added together with 5 µg/ml and 50 µg/ml of the sDSS1 protein. After incubation for 10 h in the incubator, the fluorescence signal in the cells was observed by fluorescence microscope. The cells were digested by trypsin to form single cells for detecting fluorescence intensity via flow cytometry.

4.2 Experimental Results

After DiL-oxLDL was added into Hep G2 cells for 9 h, the fluorescence in the cells was detected by a fluorescence microscope. The results show that obvious fluorescence is observed in cells from both the control group and experimental group, which appears in a variety of phagocytic vesicles, indicating the uptake of oxLDL by Hep G2 cells (FIGS. 7A-7F). The fluorescence value in the cells was detected by flow cytometry. As can be seen, the Dil fluorescence signal can be detected in HepG2 cells from the control group, and the addition of 5 μg/ml sDSS1 in the culture solution does not significantly affect the fluorescence level within the cells, while 50 μg/ml of the sDSS1 protein can significantly increase the DiL signal intensity in the cells (FIGS. 8A-8C). In summary of the detection results from flow cytometry, compared with the control group, the Hep G2 cells's ability of absorbing oxLDL was increased by 27% after 50 μg/ml sDSS1 protein was added into the culture solution (FIG. 9). These results suggest that the sDSS1 protein can enhance the human hepatocyte's ability of absorbing oxLDL protein.

When Dil-LDL was added into HepG2 cell culture for 10 h, it was observed that fluorescent dye appeared in the cells and distributed in the vesicles. Compared with the group adding DiL-LDL alone, the quantity of Hep G2 cells uptaking DiL-LDL was not changed significantly after 5 μg/ml or 50 μg/ml sDSS1 protein was added (FIGS. 10A-10F). The cell analysis results via flow cytometry show that after different concentrations of sDSS1 proteins were added, the fluorescence intensity in the cells is basically consistent (FIG. 11), suggesting that the sDSS1 protein has no significant effect on the uptake of LDL by human hepatocytes.

These results suggest that the sDSS1 protein can increase the uptake of oxLDL by human hepatocytes, but does not significantly affect the uptake of LDL by hepatocytes.

Example 5: The Administration of the sDSS1 Protein Reduces the oxLDL Level and oxLDL/LDL Ratio in the Plasma of ApoE-/- Mice 5.1 Experimental Materials and Methods Experimental animal: ApoE-/- mice, 8-10 weeks old, male, were purchased from Nanjing Biomedical Research Institute of Nanjing University. The animals were housed in an animal room for one week before the experiment.

Experimental materials: sDSS1 protein, oxLDL ELISA kit (Wuhan Elabscience Biotechnology Co., Ltd., Article No.: E-EL-M0066c), LDL ELISA kit (Wuhan Elabscience Biotechnology Co., Ltd., product No.: E-EL-M1363c)

Experimental method: the ApoE-/- mice were randomly divided into two groups, a control group and a sDSS1 protein group. For 7 days, 200 μl of normal saline was intraperitoneally injected in control group once a day, and 10 mg/kg of the sDSS1 protein was intraperitoneally injected in sDSS1 protein group once a day. After 7 days of administration, the bloods of mice were collected, and plasma was separated with EDTA-Na as an anticoagulant. The plasma oxLDL level was measured by using the oxLDL ELISA kit, and the plasma LDL level was measured by the LDL ELISA kit.

100 μl of oxLDL standards or samples were added in each well, and incubated for 90 min at 37° C.; the liquid in the well was discarded, 100 μl of biotinylated oxLDL antibody working liquid was added, and incubated at 37° C. for 60 min; washing 3 times; 100 μl of enzyme binding working solution was added, and incubated at 37° C. for 30 min; washing 5 times; 90 μl of substrate solution was added, and incubated at 37° C. for 15 min; 50 μl of termination solution was added, and the OD value was immediately measured at 450 nm wavelength; a standard curve was established with standard products, and the oxLDL level of each sample was calculated according to the standard curve.

100 μl of LDL standards or samples were added into each well, and incubated for 90 min at 37° C.; the liquid in the well was discarded, 100 μl of biotinylated LDL antibody working liquid was added, and incubated at 37° C. for 60 min; washing 3 times; 100 μl of enzyme binding working liquid was added, and incubated at 37° C. for 30 min; washing 5 times; 90 μl of substrate solution was added, and incubated at 37° C. for 15 min; 50 μl of termination solution was added, and the OD value was immediately measured at 450 nm wavelength; a standard curve was established by using standard products, and the LDL level of each sample was calculated according to the standard curve.

The oxLDL/LDL ratio=oxLDL concentration (ng/ml)÷ LDL concentration (ng/ml)

5.2 Experimental Results

The ApoE-/- mice were intraperitoneally injected with the sDSS1 protein for 7 days with 10 mg/kg, and then plasma LDL and oxLDL levels were detected respectively. The results show that the plasma LDL level in the mice administrated with the sDSS1 protein remains at a normal level, and has no significant difference from that of the control mice (FIG. 12). However, injection of the sDSS1 protein can significantly reduce the plasma oxLDL content in mice, and the inhibitory effect is similar to that of ATV, a positive control (FIG. 13). Through further analysis, the plasma oxLDL/LDL ratio of mice injected with the sDSS1 protein is also significantly lower than that in the control mice, which is basically consistent with the effect of ATV, a positive control (FIG. 14). In conclusion, the sDSS1 protein can reduce the plasma oxLDL level of the mice, but does not affect the plasma LDL level, finally resulting in the decrease of the plasma oxLDL/LDL ratio.

Example 6: sDSS1 Protein Inhibits Formation of Atherosclerotic Plaques in ApoE-/- Mice 6.1 Experimental Materials and Methods Experimental animals: ApoE-/- mice, 8-week-old, male, were purchased from Nanjing Biomedical Research Institute of Nanjing University. The experimental animals were housed in an animal room for one week before the experiment.

Materials: sDSS1 protein, Atorvastatin (ATV).

Experimental method: ApoE-/- mice were fed with high-fat diet containing 0.25% cholesterol starting from the age of 9 weeks. From the 10th week of high-fat diet feeding, the mice were randomly divided into three groups according to the total cholesterol level, with 10 mice in each group. 200 μl of normal saline was intraperitoneally injected in the model group once a day, 40 mg/kg of ATV was orally given in positive drug group once a day, and 3 mg/kg of sDSS1 protein was intraperitoneally injected in sDSS1 group once a day. At the 22nd week of high-fat diet feeding, that is, the 13th week of administration, the animals were executed and dissected, and the whole aorta was separated. The separated aorta was stained with en face oil red O to evaluate the formation of atherosclerotic plaques.

6.2 Experimental Results:

The results of en face staining show that in the model group, obvious atherosclerotic plaques were developed in the whole aorta of the mice, which are stained red by oil red O, while the parts without plaques were not stained and were transparent. In the positive drug group, the area of atherosclerotic plaques in the mice is significantly reduced compared with that in the model group mice, and the area of atherosclerotic plaques in the mice in the sDSS1 protein group is significantly reduced compared with that in the model group mice (FIG. 15). The area stained with oil red O and total aortic area were measured by using Image Pro Plus and the ratio was calculated (FIG. 16). ANOVA analysis shows that the plaque area ratio of positive drug group and sDSS1 protein group is significantly smaller than that of the model group (**P<0.01), but there is no significant difference in the plaque area ratio between the positive drug group and sDSS1 protein group. These results suggest that the sDSS1 protein can significantly inhibit the formation of atherosclerotic plaque in ApoE−/− mice and slow down the progression of atherosclerosis.

REFERENCES

1. Gao S, et al. Association between circulating oxidized LDL and atherosclerotic cardiovascular disease: a meta-analysis of observational studies. Can J Cardiol 2017. 33(12): 1624-1632.
2. Trialists C, et al. The effects of lowering LDL cholesterol with statin therapy in people at low risk of vascular disease: meta-analysis of individual data from 27 randomised trials. Lancet 2012. 380(9841): 581-90.
3. Califf R. M, et al. An update on the IMProved reduction of outcomes: Vytorin Efficacy International Trial (IMPROVE-IT) design. Am Heart J 2010. 159(5): 705-9.
4. National Cholesterol Education Program Expert Panel on Detection, E. and A. Treatment of High Blood Cholesterol in, Third Report of the National Cholesterol Education Program (NCEP) Expert Panel on Detection, Evaluation, and Treatment of High Blood Cholesterol in Adults (Adult Treatment Panel III) final report. Circulation 2002. 106(25): 3143-421.
5. Law M. R, N. J Wald and S. G. Thompson. How much and how quickly does reduction in serum cholesterol concentration lower risk of ischaemic heart disease? BMJ 1994. 308(6925): 367-72.
6. Rossouw J. E, Lewis B and Rifkind B. M. The value of lowering cholesterol after myocardial infarction. N Engl J Med 1990. 323(16): 1112-9.
7. The Lipid Research Clinics Coronary Primary Prevention Trial results I. Reduction in incidence of coronary heart disease. JAMA 1984. 251(3): 351-64.
8. Ren J, et al. Long-term coronary heart disease risk associated with very-low-density lipoprotein cholesterol in Chinese: the results of a 15-Year Chinese Multi-Provincial Cohort Study (CMCS). Atherosclerosis 2010. 211(1): 327-32.
9. Baigent C, et al. Efficacy and safety of cholesterol-lowering treatment: prospective meta-analysis of data from 90,056 participants in 14 randomised trials of statins. Lancet 2005. 366(9493): 1267-78.
10. Gistera A. and G. K Hansson. The immunology of atherosclerosis. Nat Rev Nephrol 2017. 13(6): 368-380.
11. Libby P. Inflammation in atherosclerosis. Nature 2002. 420(6917): 868-74.
12. Libby P, Ridker P. M and Maseri A. Inflammation and atherosclerosis. Circulation 2002. 105(9): 1135-43.
13. Ross R. Atherosclerosis—an inflammatory disease. N Engl J Med 1999. 340(2): 115-26.
14. Xu Y, et al. oxLDL/beta2GPI/anti-beta2GPI complex induced macrophage differentiation to foam cell involving TLR4/NF-kappa B signal transduction pathway. Thromb Res 2014. 134(2): 384-92.
15. Pirillo A, Norata G. D and Catapano A. L. LOX-1, OxLDL, and atherosclerosis. Mediators Inflamm 2013. 2013: 152786.
16. Singh K. K, et al. BRCA1 is a novel target to improve endothelial dysfunction and retard atherosclerosis. J Thorac Cardiovasc Surg 2013. 146(4): 949-960 e4.
17. Motamed M, et al. Oxidized low-Density lipoprotein (ox-LDL) to LDL ratio (ox-LDL/LDL) and ox-LDL to high-Density lipoprotein ratio (ox-LDL/HDL). Clin Lab 2016. 62(9): 1609-1617.
18. Harmon M. E, et al. Associations of circulating exidized LDL and conventional biomarkers of cardiovascular disease in a cross-sectional study of the navajo population. PLoS One 2016. 11(3): e0143102.
19. Pawlak K, Mysliwiec M and Pawlak D. Oxidized low-density lipoprotein (oxLDL) plasma levels and oxLDL to LDL ratio, are they real oxidative stress markers in dialyzed patients? Life Sci 2013. 92(4-5): 253-8.
20. Sun, B., et al., Distinct mechanisms for OxLDL uptake and cellular trafficking by class B scavenger receptors CD36 and SR-BI. J Lipid Res 2007. 48(12): 2560-70.
21. Gillotte-Taylor, K., et al., Scavenger receptor class B type I as a receptor for oxidized low density lipoprotein. J Lipid Res 2001. 42(9): 1474-82.
22. Kragelund B. B, et al. DSS1/Sem1, a Multifunctional and Intrinsically Disordered Protein. Trends Biochem Sci 2016. 41(5): 446-459.
23. Li J, et al. DSS1 is required for the stability of BRCA2. Oncogene 2006. 25(8): 1186-94.
24. Liu J, et al. Human BRCA2 protein promotes RAD51 filament formation on RPA-covered single-stranded DNA. Nat Struct Mol Biol 2010. 17(10): 1260-2.
25. van Silfhout A. T, et al. Split hand/foot malformation due to chromosome 7q aberrations (SHFM1): additional support for functional haploinsufficiency as the causative mechanism. Eur J Hum Genet 2009. 17(11): 1432-8.
26. Zhou Q, et al. Dss1 interaction with Brh2 as a regulatory mechanism for recombinational repair. Mol Cell Biol 2007. 27(7): 2512-26.
27. Zhang Y, et al. DSSylation, a novel protein modification targets proteins induced by oxidative stress, and facilitates their degradation in cells. Protein Cell 2014. 5(2): 124-40.

```
Sequence Listing
SEQ ID NO: 1:
MSEKKQPVDLGLLEEDDEFEEFPAEDWAGLDEDED

AHVWEDNWDDDNVEDDFSNQLRATVLLMILVCETP

YGCYVLHQKGRMCSAFLCC

SEQ ID NO: 2:
MSEKKQPVDLGLLEEDDEFEEFPAEDWAGLDEDED

AHVWEDNWDDDNVEDDFSNQLRATVLLMILVCETP

YGCYVLHQKGRMCSAFLCC

SEQ ID NO: 3:
MSEKKQPVDLGLLEEDDEFEEFPAEDWAGLDEDED

AHVWEDNWDDDNVEDDFSNQLRATVLLMILVCETP

YGCYVLHQKGRMCSAFLCC

SEQ ID NO: 4:
MSEKKQPVDLGLLEEDDEFEEFPAEDWAGLDEDED

AHVWEDNWDDDNVEDDFSNQLRATVLLMVLVCETP

YGCYVLHQKERMCSAFLCC

SEQ ID NO: 5:
MSEKKQPVDLGLLEEDDEFEEFPAEDWAGLDEDED

AHVWEDNWDDDNVEDDFSNQLRVTVLLMILVCETL

YGCYVLHQKGRMCSAFLCC
```

-continued

SEQ ID NO: 6:
MSEKKQPVDLGLLEEDDEFEEFPAEDWAGLDEDED

AHVWEDNWDDDNVEDDFSNQLRATILLMILVCETP

YGCYVLHQKGRMCSAFLCC

SEQ ID NO: 7:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 8:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 9:
MSEKKQPVDLGLLEEDDEFEEFPAEDWAGLDEDED

AHVWEDNWDDDNVEDDFSNQLRATVLLMIKVYETP

YGCYILHQKGRMCIAFLCC

SEQ ID NO: 10:
MSEKKQPVDLGLLEEDDEFEEFPAEDWAGLDEDED

AHVWEDNWDDDNVEDDFSNQLRATVLLMKKVYETP

YGCYILHQKGRMCSAFLCC

SEQ ID NO: 11:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 12:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 13:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 14:
MSEKKQPVDLGLLEEDDEFEEFPAEDWAGLDEDED

AHVWEDNWDDDNVEDDFSNQLRATVLLMIKVYETP

YGCYILHQKGRMCSAFLCC

SEQ ID NO: 15:
MSEKKQPVDLGLLEEDDEFEEFPAEDWAGLDEDED

AHVWEDNWDDDNVEDDFSNQLRATVLLMILVAETP

YGAYVLHQKGRMASAFLAA

SEQ ID NO: 16:
MSEKKQPVDLGLLEEDDEFEEFPAEDWAGLDEDED

AHVWEDNWDDDNVEDDFSNQLRATVLLMILVVETP

YGVYVLHQKGRMVSAFLVV

SEQ ID NO: 17:
MSEKKQPVDLGLLEEDDEFEEFPAEDWAGLDEDED

AHVWEDNWDDDNVEDDFSNQLRA

SEQ ID NO: 18:
TVLLMILVCETPYGCYVLHQKGRMCSAFLCC

---

The invention claimed is:

1. A method for treating atherosclerosis or an atherosclerosis-related disease in a subject in need thereof, the method comprising:
   administering to said subject an effective amount of secretory deleted split hand/split foot 1 (sDSS1) protein,
   thereby treating said atherosclerosis or said atherosclerosis-related disease in said subject,
   wherein said sDSS1 protein comprises an amino acid sequence of any one of SEQ ID NOs: 4-16.

2. The method of claim 1, wherein said treating reduces lipid absorption by a vascular endothelial cell in said subject.

3. The method of claim 1, wherein the atherosclerosis-related disease is selected from the group consisting of: hypertension, angina pectoris, myocardial infarction, myocardium blood-supply insufficiency, arrhythmia, cerebral blood supply insufficiency, cerebral ischemic stroke, cerebral atrophy, renal insufficiency, renal artery stenosis, paralytic ileus, and acral ischemic necrosis.

* * * * *